United States Patent
Shimizu

(10) Patent No.: US 10,237,449 B2
(45) Date of Patent: Mar. 19, 2019

(54) IMAGE READING APPARATUS AND IMAGE FORMING APPARATUS USING THE SAME

(71) Applicant: FUJI XEROX CO., LTD., Tokyo (JP)

(72) Inventor: Kosuke Shimizu, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 117 days.

(21) Appl. No.: 15/092,691

(22) Filed: Apr. 7, 2016

(65) Prior Publication Data

US 2017/0142292 A1   May 18, 2017

(30) Foreign Application Priority Data

Nov. 18, 2015 (JP) ................... 2015-225937

(51) Int. Cl.
| | |
|---|---|
| *G06F 15/00* | (2006.01) |
| *H04N 1/48* | (2006.01) |
| *H04N 1/028* | (2006.01) |
| *H04N 1/031* | (2006.01) |
| *H04N 1/58* | (2006.01) |

(52) U.S. Cl.
CPC ........... *H04N 1/484* (2013.01); *H04N 1/0282* (2013.01); *H04N 1/031* (2013.01); *H04N 1/58* (2013.01)

(58) Field of Classification Search
CPC ...... H04N 1/484; H04N 1/0282; H04N 1/031; H04N 1/58
USPC ......................................................... 358/518
See application file for complete search history.

(56) References Cited

U.S. PATENT DOCUMENTS

| | | | |
|---|---|---|---|
| 2004/0125408 A1* | 7/2004 | Nozaki | H04N 1/3935 358/2.1 |
| 2005/0271270 A1 | 12/2005 | Hsieh et al. | |
| 2006/0023957 A1* | 2/2006 | Ito | H04N 19/172 382/232 |
| 2007/0139664 A1* | 6/2007 | Kitamura | G03G 15/0115 358/1.4 |
| 2011/0038020 A1* | 2/2011 | Kagawa | H04N 1/58 358/505 |

FOREIGN PATENT DOCUMENTS

| | | |
|---|---|---|
| JP | 2013-131861 A | 7/2013 |
| TW | 2006-01814 A | 1/2006 |

OTHER PUBLICATIONS

Feb. 17, 2017 Office Action issued in Taiwanese Patent Application No. 105115031.

* cited by examiner

*Primary Examiner* — Mark R Milia
(74) *Attorney, Agent, or Firm* — Oliff PLC

(57) ABSTRACT

An image reading apparatus includes a light source, a detector, and an image processing unit that processes an image so as to determine a color and density of each pixel based on image signals detected by the detector. The image processing unit includes a determination unit that compares a target pixel and adjacent front and rear pixels and that determines a degree of matching of the target pixel to a condition for the target pixel to be a color shift pixel between the adjacent front and rear achromatic color pixels based on a pattern of the color and density. The image processing unit further includes a correction unit that variably sets a color shift correction amount based on the degree of matching, and that corrects the image signal by the color shift correction amount such that the target pixel which is the color shift pixel becomes an achromatic color pixel.

10 Claims, 22 Drawing Sheets

FIG. 11A

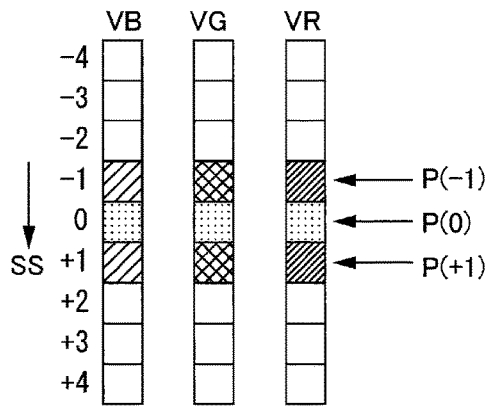

FIG. 11B $$\left.\begin{array}{l}\text{deltabb=abs( VB[-1]-VG[-1])}\\ \text{deltaab=abs( VB[+1]-VG[+1])}\\ \text{deltabr=abs( VR[-1]-VG[-1])}\\ \text{deltaar=abs( VR[+1]-VG[+1])}\end{array}\right\} \cdots \cdots (1)$$

$$\left.\begin{array}{l}\text{deltag1=abs( VG[-1]-VG[0])}\\ \text{deltag2=abs( VG[+1]-VG[0])}\\ \text{deltab1=abs( VB[-1]-VB[0])}\\ \text{deltab2=abs( VB[+1]-VB[0])}\\ \text{deltar1=abs( VR[-1]-VR[0])}\\ \text{deltar2=abs( VR[+1]-VR[0])}\end{array}\right\} \cdots \cdots (2)$$

$$\left.\begin{array}{l}\text{keisu\_edge= (mulK1*(deltag1+deltag2+deltaab1+deltab2+deltar1+deltar2))/divK}\\ \text{if(keisu\_edge> } \alpha \text{ ) keisu\_edge=} \alpha\end{array}\right\} (3)$$

$$\left.\begin{array}{l}\text{keisu = subK - (deltabb+deltaab+deltabr+deltaar);}\\ \text{if(keisu<0 keisu = 0;}\\ \text{keisu = (mulK2 * keisu) >>shiftK;}\end{array}\right\} \cdots \cdots (4)$$

$$\left.\begin{array}{l}\text{keisu = keisu * keisu\_edge;}\\ \text{if(keisu> } \beta \text{ ) keisu=} \beta\end{array}\right\} \cdots \cdots (5)$$

FIG. 13

$$\left.\begin{array}{l}\text{if(VG[0] > VB[0])}\\\quad\{\text{ tmpint\_2 = VB[0] + ((VG[0]-VB[0]) * keisu)}/\gamma\\\quad\quad\text{if(tmpint\_2 > }\eta\text{ ) tmpint\_2 = }\eta\\\quad\quad\text{if(tmpint\_2 < 0) tmpint\_2 = 0;}\\\text{AFTER CORRECTION B = tmpint\_2; \}}\end{array}\right\} \cdots\cdots(6)$$

$$\left.\begin{array}{l}\quad\text{else}\\\quad\{\text{ tmpint\_2 = VB[0] - ((VB[0]-VG[0]) * keisu)}/\gamma\\\quad\quad\text{if(tmpint\_2 > }\eta\text{ ) tmpint\_2 = }\eta\\\quad\quad\text{if(tmpint\_2 < 0) tmpint\_2 = 0;}\\\text{AFTER CORRECTION B = tmpint\_2; \}}\end{array}\right\} \cdots\cdots(7)$$

$$\text{AFTER CORRECTION G = VG[0];} \qquad\qquad\qquad \Big\}\cdots\cdots(8)$$

$$\left.\begin{array}{l}\text{if(VG[0] > VR[0])}\\\quad\{\text{ tmpint\_2 = VR[0] + ((VG[0]-VR[0]) * keisu)}/\gamma\\\quad\quad\text{if(tmpint\_2 > }\eta\text{ ) tmpint\_2 = }\eta\\\quad\quad\text{if(tmpint\_2 < 0) tmpint\_2 = 0;}\\\text{AFTER CORRECTION R = tmpint\_2; \}}\end{array}\right\} \cdots\cdots(9)$$

$$\left.\begin{array}{l}\quad\text{else}\\\quad\{\text{ tmpint\_2 = VR[0] - ((VR[0]-VG[0]) * keisu)}/\gamma\\\quad\quad\text{if(tmpint\_2 > }\eta\text{ ) tmpint\_2 = }\eta\\\quad\quad\text{if(tmpint\_2 < 0) tmpint\_2 = 0;}\\\text{AFTER CORRECTION R = tmpint\_2; \}}\end{array}\right\} \cdots\cdots(10)$$

EXPLANATORY DIAGRAM FOR EXAMPLE OF CORRECTION

SUB-SCANNING DIRECTION SS

WHITE AND BLACK LADDER DOCUMENT IMAGE

LADDER READING DENSITY DISTRIBUTION DIAGRAM WHEN 600dpi

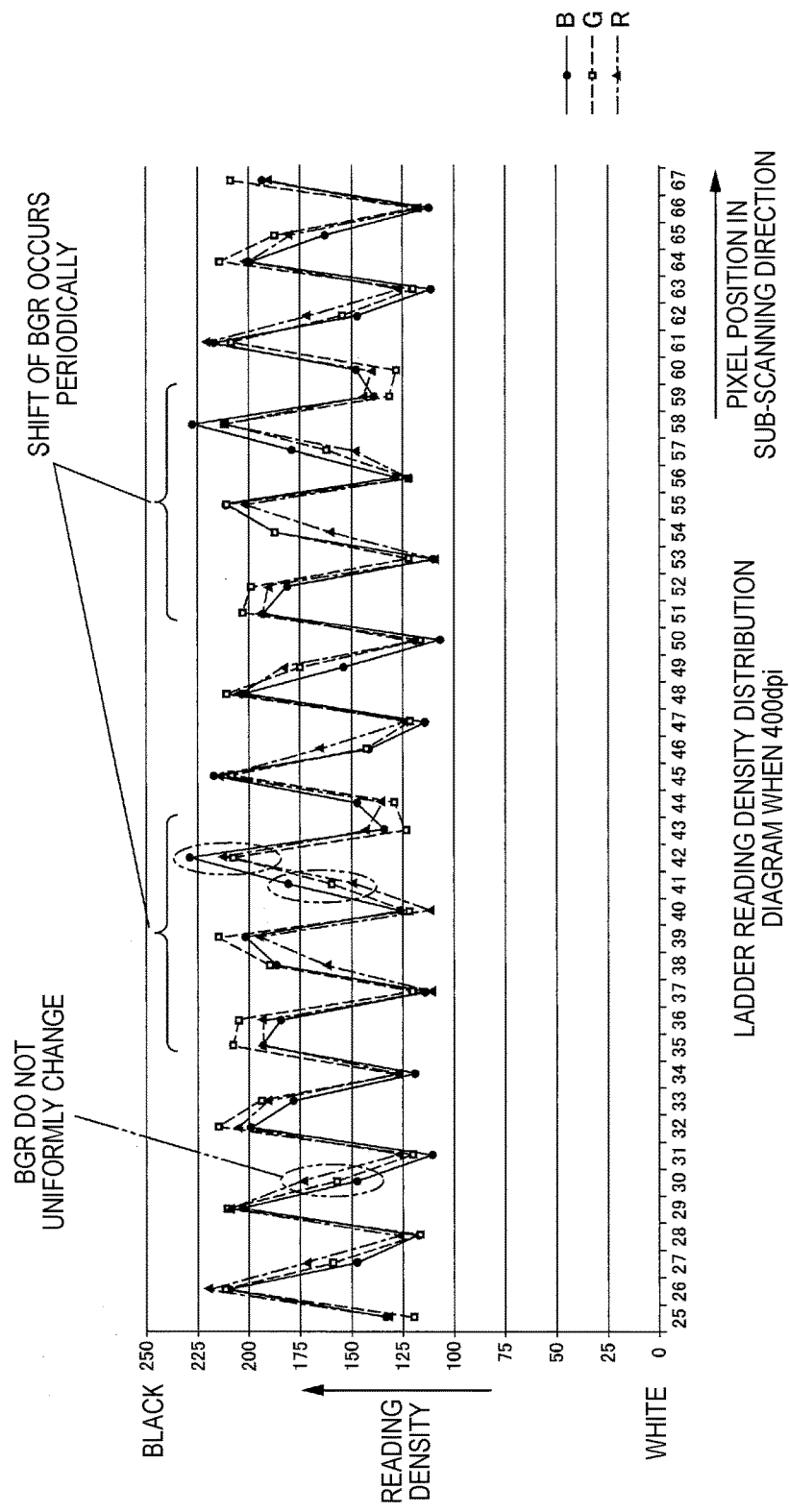

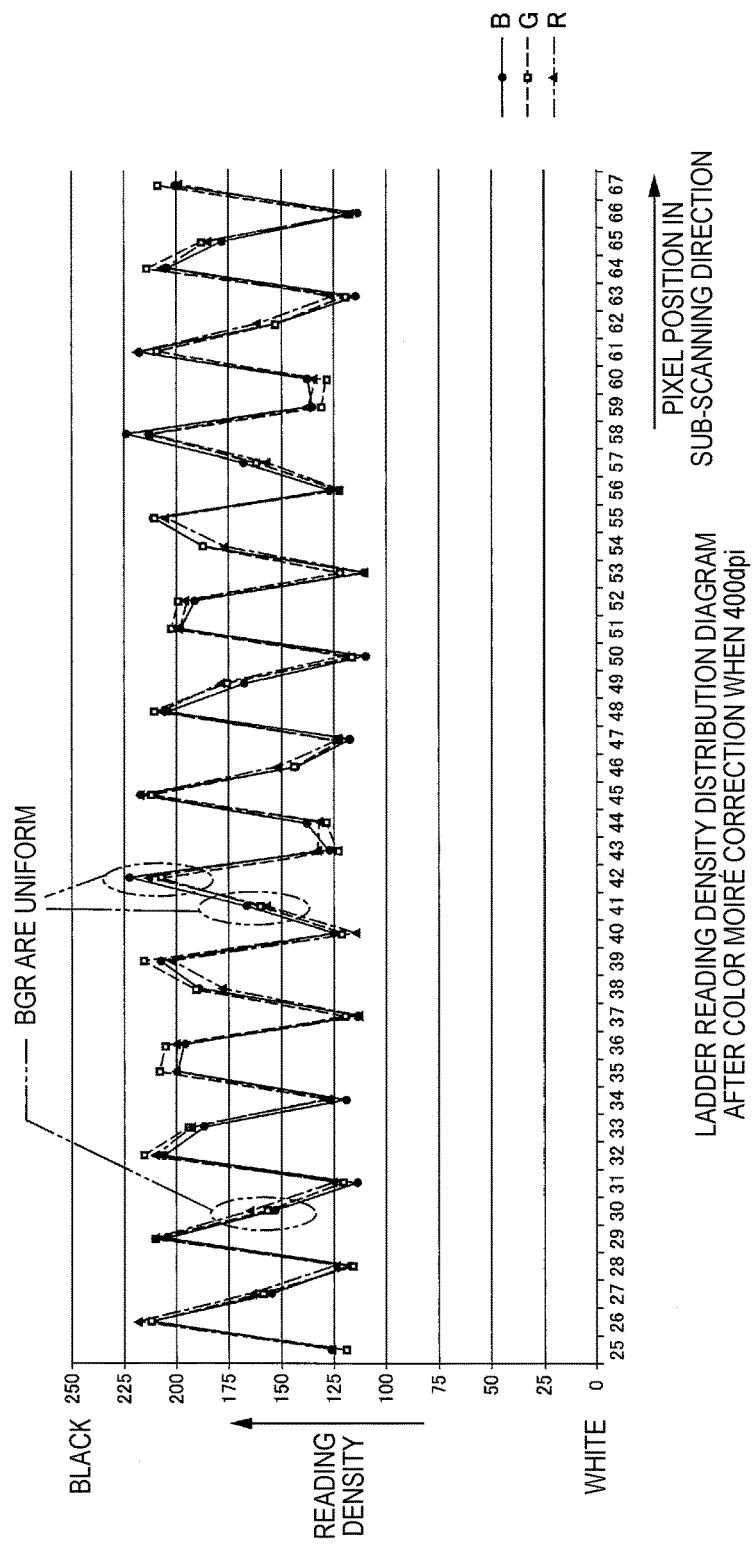

WHITE AND BLACK HALFTONE
DOCUMENT IMAGE

HALFTONE READING DENSITY DISTRIBUTION
DIAGRAM WHEN 400dpi

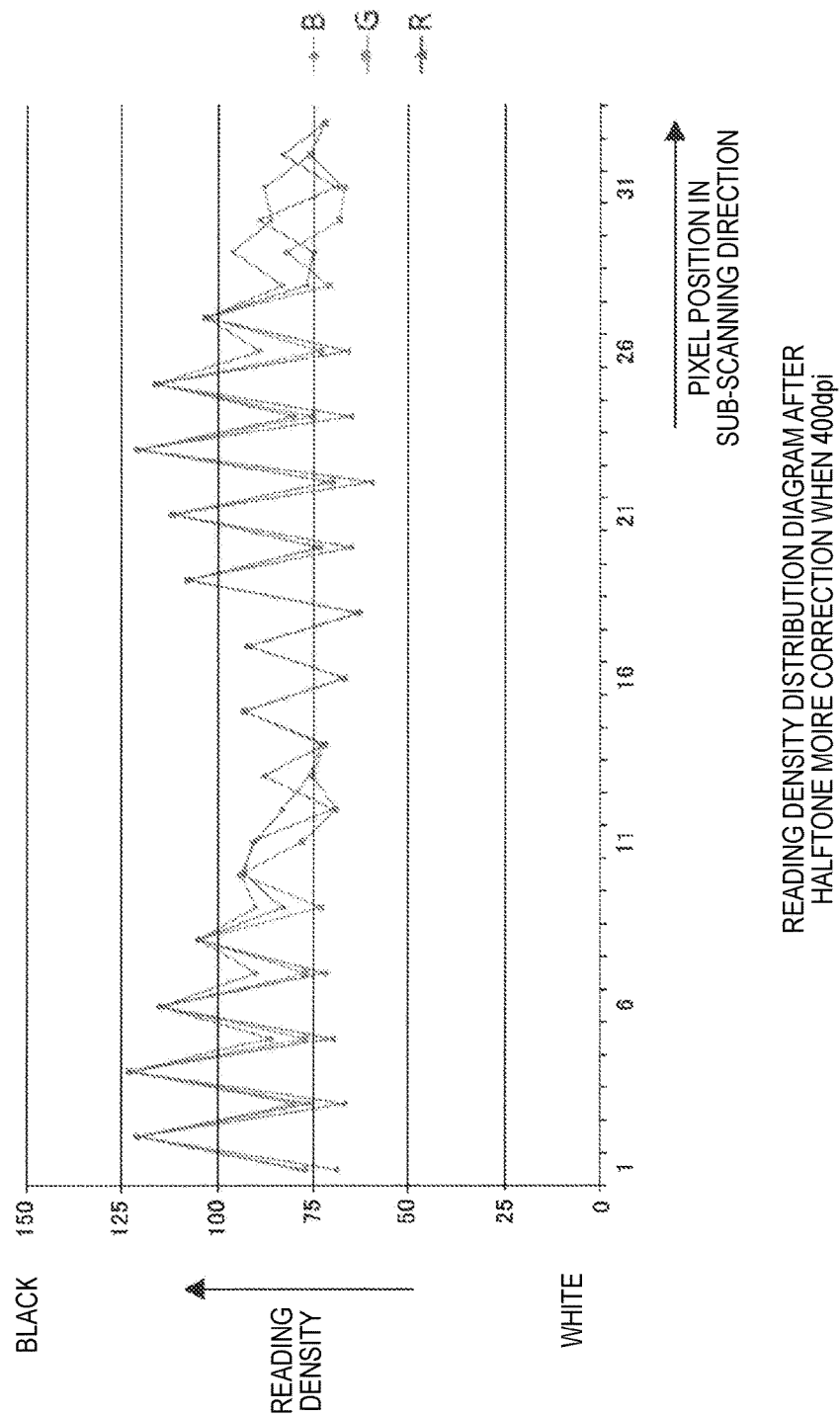

IMAGE READING APPARATUS AND IMAGE FORMING APPARATUS USING THE SAME

CROSS-REFERENCE TO RELATED APPLICATIONS

This application is based on and claims priority under USC 119 from Japanese Patent Application No. 2015-225937, filed on Nov. 18, 2015.

BACKGROUND

Technical Field

The present invention relates to an image reading apparatus and an image forming apparatus using the same.

SUMMARY

An aspect of the invention provides an image reading apparatus including: a light source that sequentially radiates lights having color components different from each other onto a reading target; a detector that sequentially detects lights having each color component reflected from the reading target among the lights radiated from the light source, the detector detecting the lights as image signals; and an image processing unit that processes an image of the reading target so as to determine a color and density of each pixel of the image of the reading target based on the image signals having each color component detected by the detector. The image processing unit includes a determination unit that compares a target pixel in the image of the reading target and adjacent front and rear pixels of the target pixel along a detecting direction by the detector and that determines a degree of matching of the target pixel to a condition for the target pixel to be a color shift pixel between the adjacent front and rear pixels which are achromatic color pixels based on a pattern of the color and density. The image processing unit further includes a correction unit that variably sets a color shift correction amount of the target pixel based on the degree of matching determined by the determination unit, and corrects the image signal of the target pixel by the color shift correction amount such that the target pixel which is the color shift pixel becomes an achromatic color pixel.

BRIEF DESCRIPTION OF DRAWINGS

Exemplary embodiment(s) of the present invention will be described in detail based on the following figures, wherein:

FIG. 11A is an explanatory diagram illustrating an example of data used by a pattern determination unit;

FIG. 11B is an explanatory diagram illustrating an example of a determination algorithm for the pixel pattern determination by the pattern determination unit;

FIG. 13 is an explanatory diagram illustrating an example of a correction algorithm in a color shift correction unit;

FIG. 19 is a graph illustrating an example of the reading densities when the reading resolution is 400 dpi;

FIG. 20 is a graph illustrating an example of the reading densities after performing the correction processing used in the embodiments with respect to the reading densities in FIG. 19;

FIG. 22 is a graph illustrating an example of a reading densities after performing the correction processing used in the embodiment 1 with respect to the reading densities in FIG. 21B.

DETAILED DESCRIPTION

Overview of an Embodiment

Figure 1A:
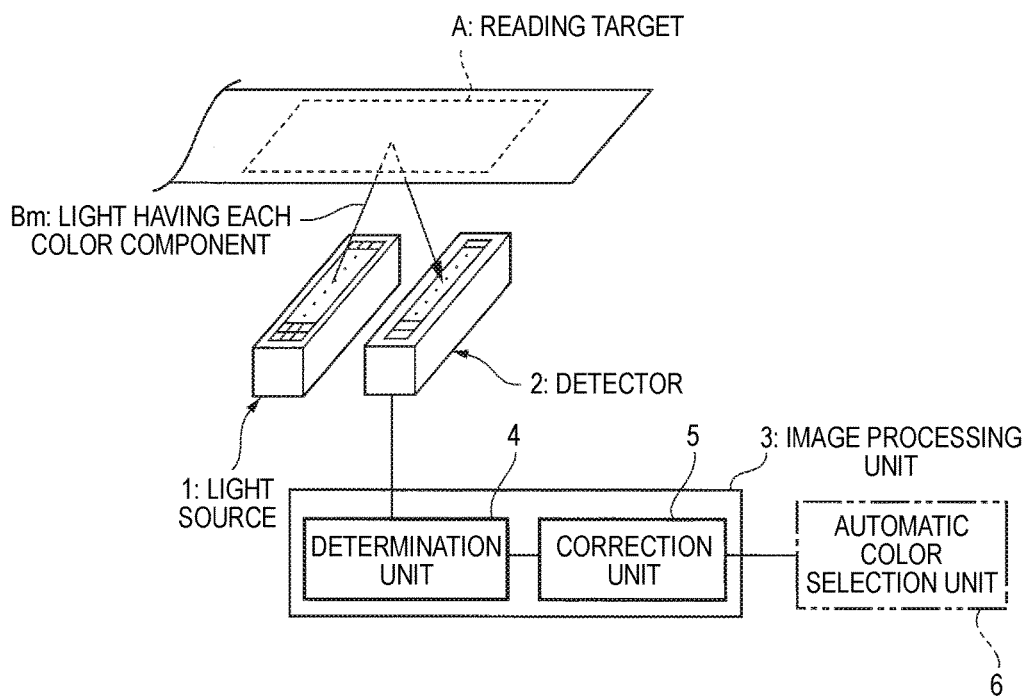
FIG. 1A is an explanatory diagram illustrating an overview of an embodiment of an image reading apparatus to which the present invention is applied.
Figure 1B:
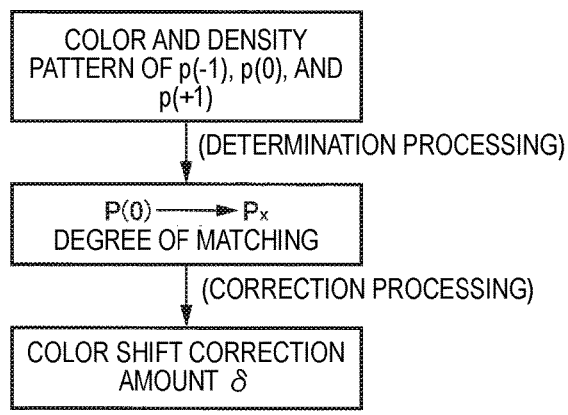
FIG. 1B is an explanatory diagram illustrating an overview of processing tasks by a determination unit and a correction unit in an image processing unit illustrated in FIG. 1A.

FIG. 1A is an explanatory diagram illustrating an overview of an embodiment of an image reading apparatus to which the present invention is applied, and FIG. 1B illustrates an overview of processing by an image processing unit.

The image reading apparatus in the drawings includes: a light source 1 that sequentially radiates lights Bm having different color components onto a reading target A, a detector 2 that sequentially detects the light reflected from the reading target A among the light Bm having each color component radiated from the light source 1, and an image processing unit 3 that processes an image of the reading target A such that a color and a density of each pixel of the image of the reading target A are determined based on an image signal of each color component detected by the detector 2. As illustrated in FIGS. 1A and 1B, the image processing unit 3 includes: a determination unit 4 that compares a target pixel P(0) of the image of the reading target A and pixels P(−1) and P(+1) adjacent to front and rear of the target pixel P(0) along the arrangement direction in the radiation region of the light Bm having each color component of the light source 1 and determines a degree of matching the conditions for the target pixel P(0) to be a color shift pixel Px between the front and rear achromatic color pixels from patterns of the color and the density; and a correction unit 5 that variably sets a color shift correction amount δ of the target pixel P(0) based on the degree of matching conditions for the target pixel P(0) to be a color shift pixel Px determined by the determination unit 4 and corrects the target pixel P(0) using the color shift correction amount δ such that the target pixel P(0) which is the color shift pixel Px becomes the achromatic color pixel.

In the technical means described above, as the light source 1 that may sequentially radiate the lights Bm having a plurality of color components different from each other, a plural types of light emitting diodes that radiates the lights Bm having each color component may be used or white light emitting diodes while providing, for example, filters of a plurality of colors may be used as the in the light source 1. In addition, the plurality of color components of the light source 1 may be equal to or more than two colors. However, from a viewpoint of reading a full-color image, colors of equal to or more than three colors, for example, R (red), G (green), and B (blue) can be used.

Furthermore, as the detector 2 that can detect the light of each color component of the light Bm reflected from the reading target A, a line sensor on which, for example, light receiving elements are arrayed according to the resolution may be used.

In addition, the light source 1 and the detector 2 may be provided as individual bodies. However, from a viewpoint of minimizing the size of the apparatus, the light source 1 and the detector 2 may be configured to be integrated as so-called a contact image sensor (CIS).

In addition, as illustrated in FIG. 1B, the image processing unit 3 may execute the determination processing of the color shift pixel Px between the achromatic color pixels and the correction processing of the color shift pixel Px according to the predetermined algorithms. Here, the target pixel P(0) and the pixels P(−1) and P(+1) adjacent to front and rear of the target pixel P(0) are subject to the three pixels arranged along the arrangement direction in the radiation region of the light Bm having each color component of the light source 1. Furthermore, the determination unit 4 is a unit that compares the target pixel P(0) and the pixels P(−1) and P(+1) in front of and to the rear of the target pixel P(0) and determines a degree of matching the conditions for the target pixel P(0) to be a color shift pixel Px between achromatic color pixels in front of and to the rear of the target pixel P(0) from the patterns of the color and the density. As the degree increases, it means that the target pixel P(0) is the color shift pixel Px, and as the degree increases, it means that the target pixel P(0) is not the color shift pixel Px.

In addition, the correction unit 5 may be a unit that variably sets a color shift correction amount δ based on the degree of matching conditions determined by the determination unit 4 and correct the target pixel P(0) using the color shift correction amount δ such that the target pixel P(0) which is the color shift pixel Px becomes the achromatic color pixel. Here, a color system used in the correction unit 5 is not limited to an RGB color system, and an L*a*b* color system or another known color system may be used.

Here, the image reading principle of the image reading apparatus in the present embodiment and examples of the read image signals before and after the correction by the image processing unit 3 will be described using (a), (b), and (c) in FIG. 2. Now, as illustrated in FIG. 1A, in the line-sequential method in which the light Bm having color components different from each other (in the present example, the light having three color components of B (blue), G (green), and R (red) is used) is sequentially radiated onto the reading target image A from the light source 1 and the light reflected from the reading target A is detected by the detector 2, reading positions by the light Bm having each color component of BGR with respect to the columns of predetermined pixel P are shifted by ⅓ line as illustrated in (a) in FIG. 2. Therefore, a reading position shift inevitably occurs.

Figure 2:
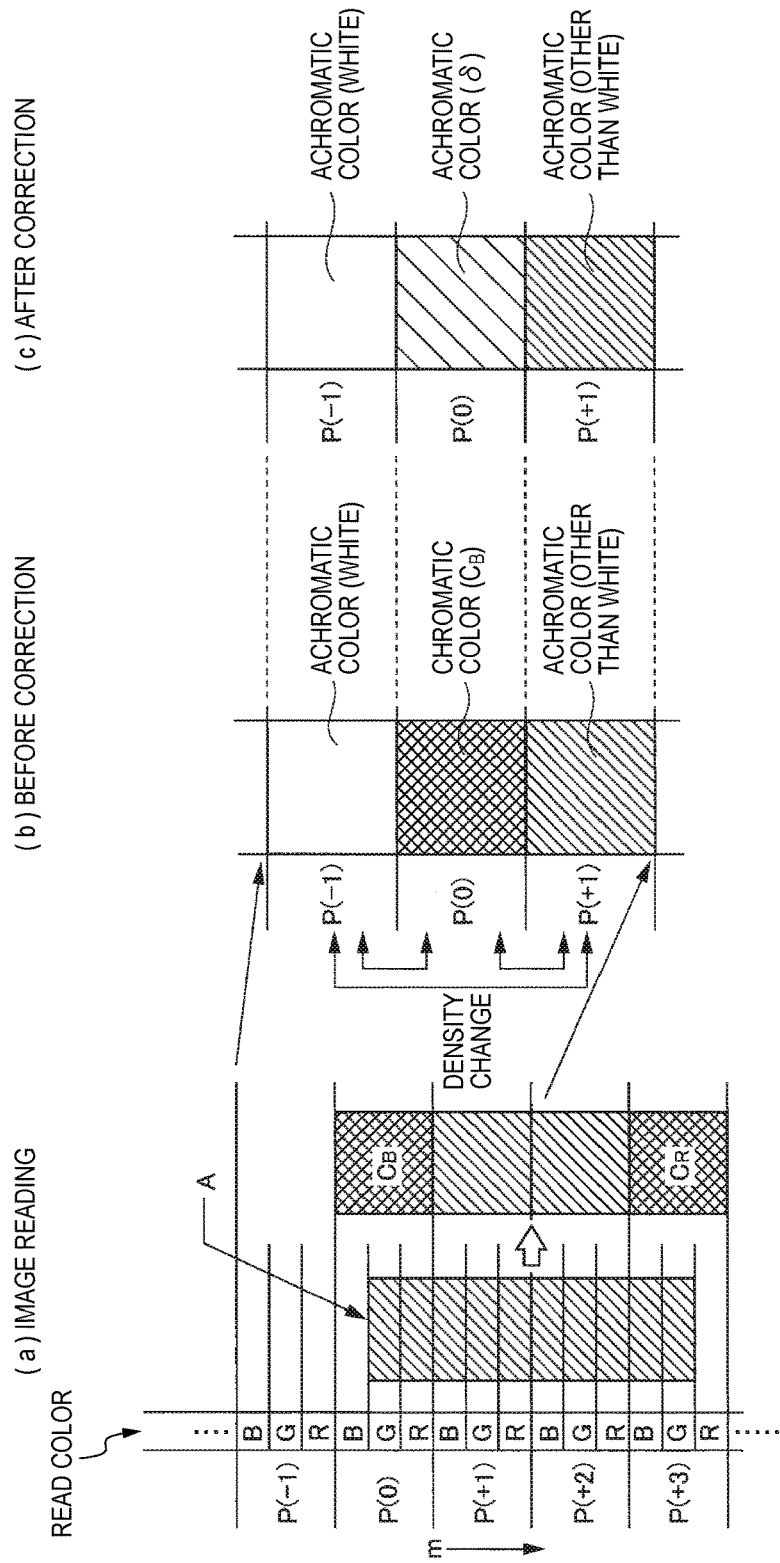
FIG. 2 is an explanatory diagram illustrating; (a) an image reading principle by the image reading apparatus illustrated in FIG. 1A, (b) an example of image signals before the correction of a target pixel and pixels in front of and to the rear of the target pixel of an image of a reading target image, and (c) an example of image signals after the correction of the target pixel and the pixels in front of and to the rear of the target pixel of the image of the reading target.

At this time, as illustrated in (a) in FIG. 2, in an aspect in which the achromatic colored image of the reading target A includes a plurality of pixels arranged along the arrangement direction (illustrated as m in (a) in FIG. 2) in the radiation region of the light Bm having each color component, for example, since the pixels P(+1) and P(+2) have achromatic color pixels on the radiation region of light Bm of all the color components of BGR, the read image signal becomes to have characteristics as the achromatic color pixel. However, for example, since the pixel P(0) have achromatic color pixels on the radiation region of light Bm of the color components of GR among the light Bm having each color component and have not achromatic color pixels on the radiation region of light Bm of the color component B, the read image signal becomes to have characteristics as the chromatic color shift pixel (in the present example, the color component of B). As a result, in a pixel portion positioned at a boundary region with a background portion of the achromatic colored image of the reading target A, a color shift in which the read image signal becomes the chromatic color pixel occurs despite that the read image signal is originally the achromatic color pixel. Particularly, in a case where the image reading is executed using the detector 2 having a low resolution of lower than 600 dpi for example, since an amount of shift of the reading position by the light Bm having each color component is large, the appearance of the color shift described above is remarkable.

In the present example, as a result of analyzing the color shift phenomenon described above, for example, as illustrated in (a) and (b) in FIG. 2, when comparing the target pixel P(0) and pixels P(−1) and P(+1) adjacent to front and rear of the target pixel P(0) in a direction an arrow m, the determination unit 4 determines the degree of matching the conditions for the target pixel P(0) to be the color shift pixel Px between front and rear achromatic color pixels from the patterns of the color and the density. In the present example, since one pixel P(−1) among the pixels P(−1) and P(+1) in front of and to the rear of the target pixel P(0) is an achromatic color pixel (white), the other pixel P(+1) is an achromatic color pixel (other than white), and the target pixel P(0) is a chromatic color pixel ($C_B$: blue), there is a possibility that the conditions to be the color shift pixel Px between the front and rear achromatic color pixels can be satisfied. However, since the density patterns of the front and rear achromatic color pixels P(−1) and P(+1) differ from each other depending on the density changes and also differ from each other depending on the difference in densities of each color component of each pixel, the degree of matching the conditions for the target pixel P(0) to be the color shift pixel Px is determined while considering the difference of density patterns of the front and rear achromatic color pixels P(−1) and P(+1). Here, as the density patterns of the front and rear achromatic color pixels P(−1) and P(+1), in a case where an amount of density change is extremely large such as one is a white pixel as the density pattern of the achromatic color pixel and the other is a white pixel as the density pattern of the achromatic color pixel, the degree of matching the conditions for the target pixel P(0) which is the chromatic color pixel to be the color shift pixel Px is high, and conversely, as the density patterns of the front and rear achromatic color pixels P(−1) and P(+1), in a case where the amount of density change is small, the degree of matching the conditions for the target pixel P(0) which is the chromatic color pixel to be the color shift pixel Px becomes low.

In (a) in FIG. 2, a pixel P(+2) indicates an achromatic color pixel (other than white) and a pixel P(+3) indicates a chromatic color pixel ($C_R$: red).

Furthermore, in the present embodiment, the correction unit 5 variably sets the color shift correction amount δ of the target pixel P(0) based on the determination result (degree of matching) by the determination unit 4 and corrects the target pixel P(0) using the color shift correction amount δ such that the target pixel P(0) which is the color shift pixel Px becomes the achromatic color shift pixel. Here, the color shift correction amount δ is a correction amount to eliminate a color which is a cause of the color shift to change the color shift pixel Px to the achromatic color pixel such that the color shift of the target pixel P(0) as the color shift pixel Px is corrected, and is set to be larger as the degree of matching the conditions for the target pixel P(0) to be the color shift pixel Px becomes higher, and is set to be smaller as the degree of matching becomes lower. As a result performing this processing, as illustrated in (c) in FIG. 2, in a case where the target pixel P(0) matches the conditions to be the color shift pixel Px between the achromatic color pixels, the image signal of the target pixel P(0) is corrected by the color shift correction amount δ set according to the degree of matching described above, and then, is replaced with the achromatic color pixel having no color shift.

Figure 3:
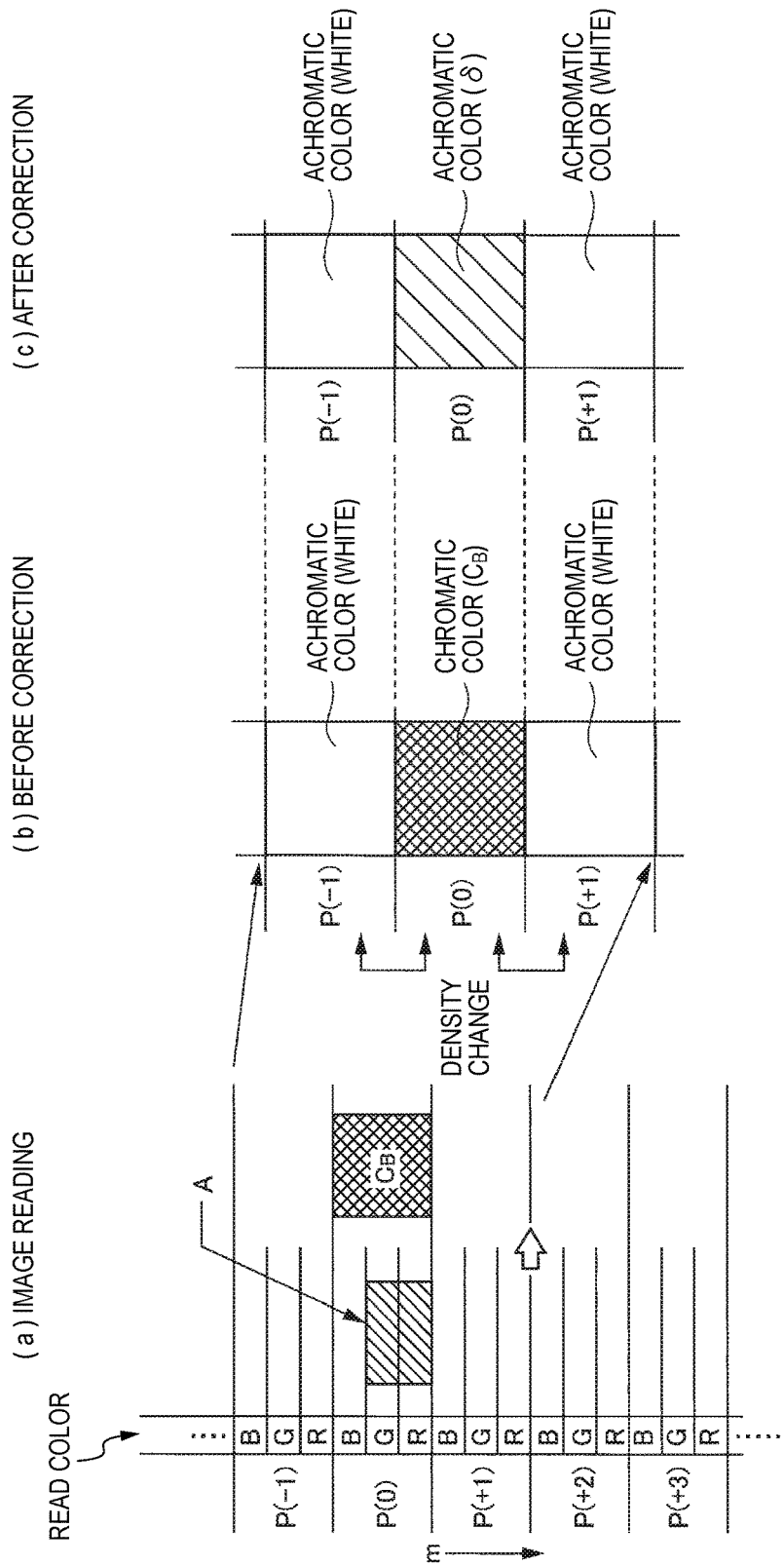
FIG. 3 is an explanatory diagram illustrating; (a) an example of a reading image pattern which is different from that in (a) in FIG. 2, (b) an example of image signals before the correction of a target pixel and pixels in front of and to the rear of the target pixel of the image of the reading target image illustrated in (a), and (c) an example of image signals after the correction of the target pixel and the pixels in front of and to the rear of the target pixel of the image of the image of the reading target illustrated in (a)

In addition, in a case where the achromatic colored image of the reading target A has, for example, an achromatic colored halftone image pattern other than the image pattern illustrated in (a) in FIG. 2, the image of the reading target A is present in the region of the target pixel P(0) as illustrated in (a) in FIG. 3 for example, and there may be a case where the image of the reading target A is not present in the region of front and rear pixels P(−1) and P(+1). In this case, as illustrated in (b) in FIG. 3, as the density patterns of the front and rear achromatic color pixels P(−1) and P(+1), one is white pixel as the density pattern of the achromatic color pixel and the other is also a white pixel as the density pattern of the achromatic color pixel, and the target pixel P(0) has characteristics of the chromatic color pixel ($C_B$: blue). Even though the target pixel has such an image pattern, in the target pixel P(0), a color shift in which the read image signal becomes the chromatic color pixel occurs despite that the target pixel is originally the achromatic color pixel. For this reason, for such an image pattern also, the determination unit 4 needs to consider the fact that the target pixel P(0) matches the conditions to be the color shift pixel Px between the achromatic color pixels.

In the present example, when one pixel P (−1) among the pixels P(−1) and P(+1) in front of and to the rear of the target pixel P(0) is an achromatic color pixel (white), the other pixel P(+1) is an achromatic color pixel (white), and the target pixel P(0) is a chromatic color pixel ($C_B$: blue), the target pixel P(0) is treated as there is a possibility that the conditions to be the color shift pixel Px between the front and rear achromatic color pixels can be satisfied.

At this time, since the both the achromatic color pixels P(−1) and P(+1) in front of and to the rear of the target pixel P(0) are white pixels, the amount of density change between the achromatic color pixels P(−1) and the P(+1) may be calculated not only by directly obtaining the difference of the two density changes, but also may be calculated by dividing the amount of density change between the achromatic color pixels P(−1) and the P(+1) into the density change between the achromatic color pixel P(−1) and the target pixel P(0) and the density change between the achromatic color pixel P(+1) and the target pixel P(0), and then, adding the two density changes. Then, the determination unit 4 may be configured to determine the degree of matching the conditions for the target pixel P(0) to be the color shift pixel Px between the front and rear achromatic color pixels from the amount of density change.

Furthermore, the correction unit 5 variably sets the color shift correction amount δ of the target pixel P(0) based on the result of determination (the degree of matching) by the determination unit 4, and corrects the target pixel P(0) using the color shift correction amount δ such that the target pixel P(0) which is the color shift pixel Px becomes the achromatic color shift pixel. As a result of performing such correction processing, as illustrated in (c) in FIG. 3, in a case where the target pixel P(0) matches the conditions to be the color shift pixel Px between the achromatic color pixels, the image signal of the target pixel P(0) is corrected by the color shift correction amount δ set according to the degree of matching described above, and then, is replaced with the achromatic color pixel having no color shift. In the image pattern illustrated in (a) in FIG. 2, since one of the pixels P(−1) and P(+1) in front of and to the rear of the target pixel P(0) which is the chromatic color pixel is the white pixel and the other pixel is a achromatic color pixel of other than white, the amount of density change between the achromatic color pixels P(−1) and P(+1) can be calculated by adopting the method of directly calculating the density change between the front and rear achromatic color pixels P(−1) and P(+1).

However, as similar to the method of calculating the amount of density change in a case of the image pattern illustrated in (a) in FIG. 3, it is needless to say that the amount of density change between the achromatic color pixels P(−1) and the P(+1) may be calculated by dividing the amount of density change between the achromatic color pixels P(−1) and the P(+1) into two such as the amounts of density change between the achromatic color pixel P(−1) and the target pixel P(0) and the density change between the achromatic color pixel P(+1) and the target pixel P(0), and then, adding the two density changes.

Next, a representative aspect or a preferable aspect used in the present embodiment will further be described.

First, in the present embodiment, as a preferable function of the determination unit 4, an aspect can be exemplified, in which the conditions for the target pixel P(0) to be the color shift pixel Px between achromatic color pixels in front of and to the rear of the target pixel P(0) can be determined by detecting that the pixels P(−1) and P(+1) adjacent to front and rear of the target pixel P(0) is the achromatic color pixels and detecting the density change between the pixels P(−1) and P(+1) adjacent to front and rear of the target pixel P(0), and by detecting that the target pixel P(0) is the chromatic color pixel. The present example represents a method in which, as the color and the density pattern of the target pixel P(0), it is detected that the front and rear pixel s P(−1) and P(+1) are white pixels and the achromatic color pixel (including the white pixel) and the density change thereof is detected, and it is detected that the target pixel P(0) is the chromatic color pixel.

In the present example, as the method of calculating the degree of matching determined by the determination unit 4, it is determined whether or not the pixel pattern is such that one of the front and rear pixels is a white pixel and the other is an achromatic color pixel other than a white pixel from the fact that the pixels P(−1) and P(+1) adjacent to front and rear of the target pixel P(0) are the achromatic color pixel and the density changes of the pixels P(−1) and P(+1) adjacent to front and rear of the target pixel P(0), and then, the degree of matching the conditions to be the color shift pixel Px.

In addition, as another method of calculating the degree of matching by the determination unit 4, by detecting that the target pixel P(0) is a chromatic color pixel and pixels P(−1) and P(+1) adjacent to front and rear of the target pixel P(0) are achromatic color pixel, the target pixel P(0) is assumed to match the conditions to be the color shift pixel Px between the front and rear achromatic color pixels, and then, the degree of matching the conditions to be the color shift pixel Px from the density changes between the pixels adjacent to front and rear of the target pixel P(0).

Furthermore, a preferable aspect of the determination unit 4 is to calculate the degree of matching conditions for the target pixel P(0) to be the color shift pixel Px between the front and rear achromatic color pixels as a correction coefficient, and the correction unit 5 variably sets the color shift correction amount δ using the correction coefficient. The present example represents a method in which the degree of matching conditions for the target pixel P(0) to be the color shift pixel Px between the achromatic color pixel is calculated as the correction coefficient and the color shift is corrected using the correction coefficient.

In addition, a representative aspect of the correction unit 5 is to calculate the difference in the densities between a predetermined color component and other color components among the densities of each color components of the target pixel P(0), and then, set the color shift correction amount δ while adding the degree of matching calculated by the by the determination unit 4 to the difference in densities. The present example represents a method in which the focus is on the difference in densities between a specific color components and the other color components among the densities of each color component of the target pixel P(0), and the density approaches the density of the specific color component while considering the degree of matching obtained by the determination unit 4. Here, the color shift of the target pixel P(0) can be reduced by correcting the density values of, for example, R and B to approach a density value of G as the correction target color components.

Furthermore, another representative function of the correction unit 5 is to calculate the difference in densities between a maximum and a minimum value of each color component of the target pixel P(0), and then, to set the color shift correction amount δ while adding the degree of matching calculated by the by the determination unit 4 to the difference in densities. The present example represents a method in which the focus is on the difference in densities between the maximum and the minimum value of each color component of the target pixel P(0) among the densities of each color component of the target pixel P(0) and the difference in densities is reduced while considering the degree of matching obtained by the determination unit 4.

In addition, in another viewpoint of the image reading apparatus used in the present embodiment, an aspect can be exemplified, in which the apparatus includes: the light source 1 that sequentially radiates the light Bm having color components different from each other onto a reading target A; the detector 2 that sequentially detects the light reflected from the reading target A among the light Bm having each color component radiated from the light source 1; and the image processing unit 3 that performs processing on the image of the reading target A such that a color and a density of each pixel in the image of the reading target A are determined based on an image signal of each color component detected by the detector 2. Under the condition that the target pixel P(0) in the image of the reading target A is the chromatic color pixel and one of the pixels P(−1) and P(+1) adjacent to front and rear of the target pixel P(0) along the arrangement direction in the radiation region of the light Bm having each color component of the light source 1 is the white pixel and the other pixel is the achromatic color pixel (including the white pixel), the image processing unit 3 variably sets a density correction value that depends on the amount of density changes between the front and rear pixels of the target pixel P(0), and then, the target pixel P(0) is corrected to the achromatic color pixel from the chromatic color pixel. When the color patterns of the target pixel P(0) and the front and rear pixels P(−1) and P(+1) meet a predetermined color pattern condition (a condition in which the chromatic color pixel is interposed between the white pixel and the achromatic color pixel other than the white pixel), since the target pixel P(0) is the color shift pixel Px between the achromatic color pixels, the image processing unit 3 corrects the target pixel P(0) to the achromatic color pixel. However, the density level of the achromatic color pixel is variably set based on the amount of density change (stepwise density difference) of the front and rear pixels.

That is, the apparatus can be appropriately select, as long as the density correction value is set while considering the amount of density change (density difference stepwise) between the front and rear pixels when the target pixel P(0) has the pixel pattern of the color shift pixel Px between the achromatic color pixels, and then the target pixel P(0) is corrected to the achromatic color pixel from the chromatic color pixel.

Furthermore, in the present embodiment, as illustrated in an imaginary line in FIG. 1A, a preferable aspect of the image reading apparatus further includes an automatic color selection unit 6 that automatically determines whether the image of the reading target A is a color image a monochrome image. The automatic color selection unit 6 is executed with respect to the image signal corrected by the correction unit 5.

In this example, after the color shift pixel Px between the achromatic color pixels are corrected while a function of an auto color selection (ACS) is mounted, the function of ACS works. Accordingly, there is no concern that the function of ACS works without the color shift pixel Px between the achromatic color pixels being corrected.

In addition, in the present embodiment, not limited to the image reading apparatus, the image forming apparatus using the image reading apparatus may be built.

In this example, an image forming apparatus can be exemplified, which includes the image reading apparatus described above, an image forming unit that executes image forming using the image signal read by the image reading apparatus.

Here, the image forming unit may widely include the unit that executes the image forming processing using the image signal read by the image reading apparatus, and may execute the image forming on a recording material and print out the image, or in an aspect in which a function of a FAX, the image forming unit may execute the image forming processing in order to transmit the image signal read by the image reading apparatus.

Hereinafter, the present invention will be described in more detail based on the embodiments illustrated in the drawings.

Embodiment 1

<Overall Configuration of the Image Forming Apparatus>

Figure 4:
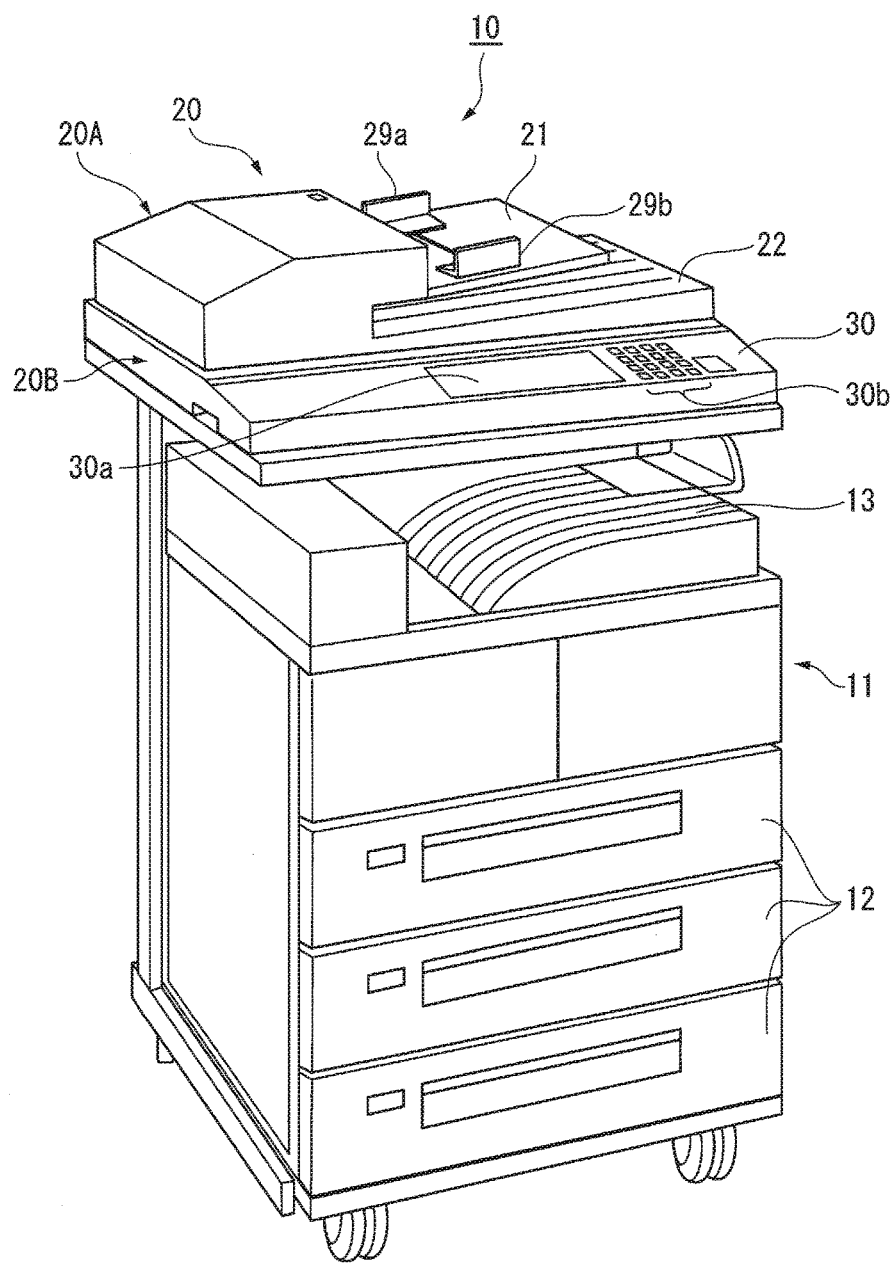
FIG. 4 is a perspective view illustrating an overview of an image forming apparatus in an embodiment 1.

FIG. 4 is a perspective view illustrating an overview of an image forming apparatus in an embodiment. An image forming apparatus 10 in the present example includes an image forming unit 11 that performs the image forming on a recording material, and an image reading apparatus 20 that is provided on the upper portion of the image forming unit 11 and supplies a image signal read from a document image as a reading target image to the image forming unit 11.

The image forming unit 11 includes a reading material accommodation device 12 (in the present example, it is configured in three stages but is not limited thereto) in which the recording material is accommodated. The recording material accommodated in the reading material accommodation device 12 is transported and an image based on image information acquired by the image reading apparatus 20 is formed on the transported recording material, and then, the recording material on which the image is formed is discharged to a discharge unit 13.

<Image Reading Apparatus>

As illustrated in FIG. 4, the image reading apparatus 20 in the present example is configured to include a document transportation unit 20A that automatically captures documents D (refer to FIG. 5) one by one and a document reading unit 20B that reads the captured documents D on the upper portion of the apparatus. The document transportation unit 20A includes a document platen 21 on which the documents D are put and a discharge tray 22 to which the documents D are discharged. In addition, a pair of guides 29a and 29b is provided on the document platen 21 to perform position determination of the documents D put on the document platen 21 in a width direction of the documents D (a direction orthogonal to the transportation direction of the documents D), and to perform guidance to the documents D when the documents D are read. Then, the document transportation unit 20A is configured to capture the documents D put on the document platen 21 and the document reading unit 20B reads the captured documents D, and then, the documents D is discharged to the discharge tray 22.

In addition, in this example, a UI (user interface) panel 30 is provided on the document reading unit 20B side, and the UI panel 30 includes a touch panel 30a that performs various displaying and has operation functions and another switch 30b other than the touch panel 30a. Various instructions for the image reading apparatus 20 to read the documents D or for the image forming unit 11 to form the image on the recording material are made by a user via the touch panel 30a and the switch 30b, and information about the input content is displayed on the touch panel 30a.

Figure 5:
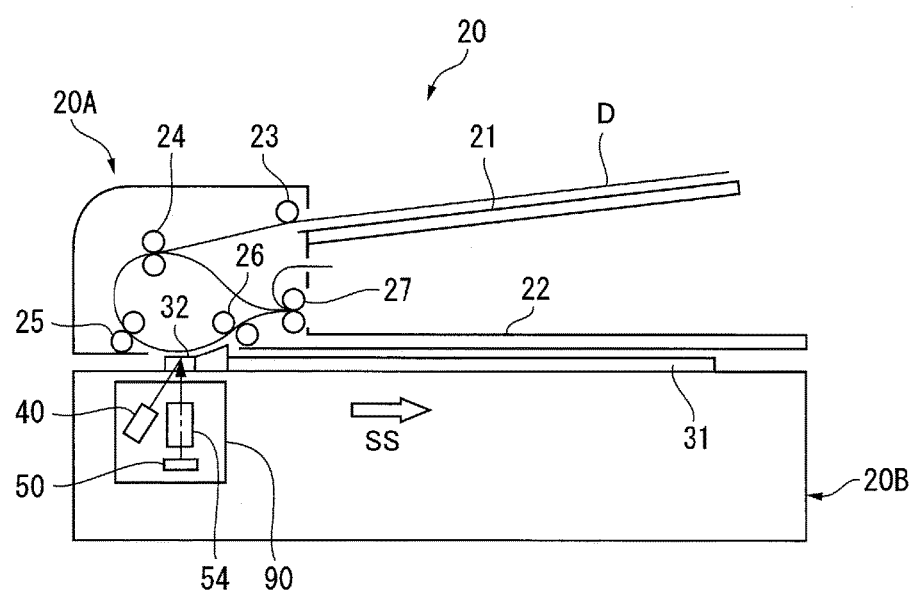
FIG. 5 is an explanatory diagram illustrating an overview of an image reading apparatus in the embodiment 1.

FIG. 5 is an explanatory diagram illustrating an overview of the image reading apparatus 20 in the present embodiment.

In the diagram, in the document transportation unit 20A of the image reading apparatus 20, a capturing roll 23 that is configured to be able to move up and down by a not illustrated mechanism and captures a sheet of document D into the inside of the document transportation unit 20A from the document platen 21 by contacting the uppermost surface of the document bundle on the document platen 21, a transportation roll 24 that transports the documents D captured by the capturing roll 23 toward the downstream side, a position alignment roll 25 that aligns the position of the documents D transported by the transportation roll 24, a pressing roll 26 that presses the documents D of which position is aligned by the position alignment roll 25 and supplied to be read, and a reverse roll 27 that discharges the documents D to the discharge tray 22 and reversely transports the documents D in order to read the opposite surface of the documents D, are appropriately arranged, and along with these, a transportation path for transporting the documents D is provided.

On the other hand, on the upper portion of the document reading unit 20B side, a transparent first platen glass 31 on which the documents D are manually set one by one and a transparent second platen glass 32 for reading the documents D captured by the document transportation unit 20A are provided. In addition, at the lower portion of the first platen glass 31 and the second platen glass 32, a contact image sensor (CIS) 90 that reads the image of the documents D is installed.

Figure 6A:
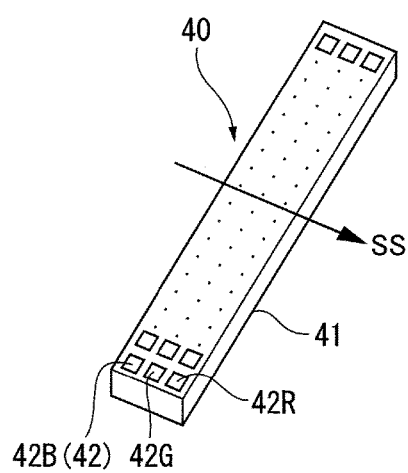
FIG. 6A is an explanatory diagram illustrating an LED module in the embodiment 1.
Figure 6B:
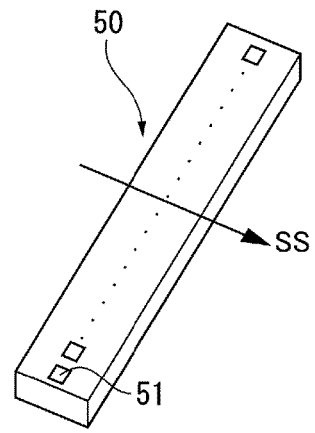
FIG. 6B is an explanatory diagram illustrating a line sensor in the embodiment 1.
Figure 7:
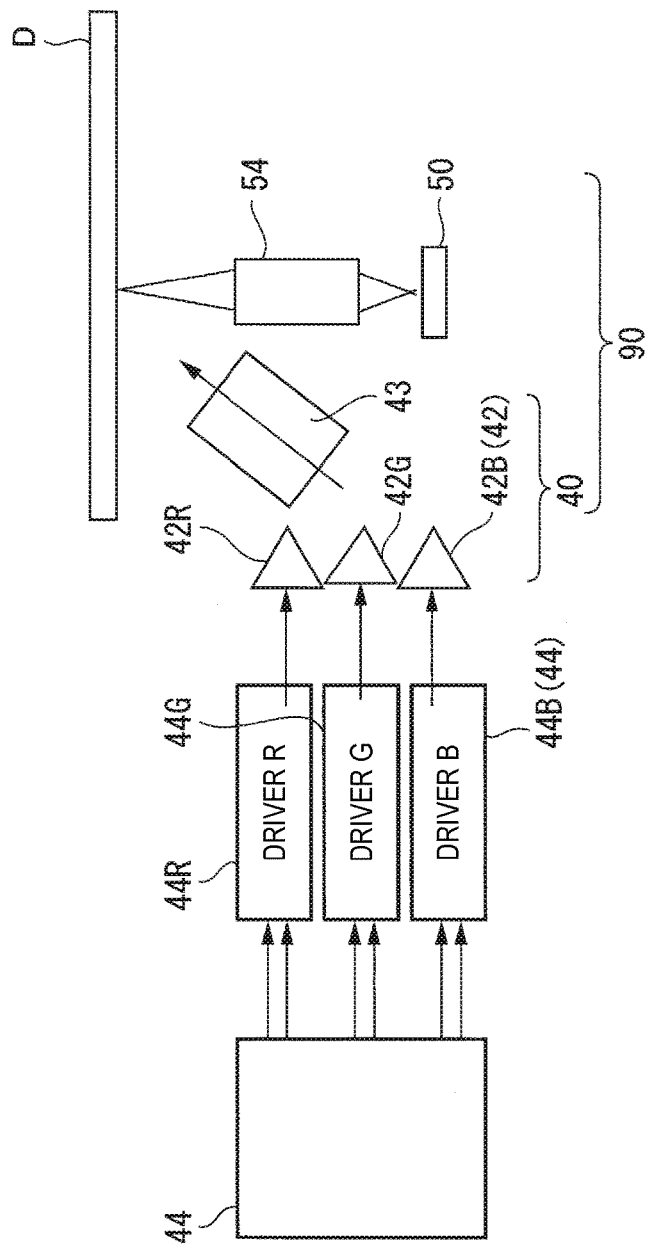
FIG. 7 is an explanatory diagram illustrating a processing system of a light source in the embodiment 1.

In the present example, as illustrated in FIGS. 5 to 7, the CIS 90 is a sensor in which a light source 40 that radiates a light to the surface of the documents D, a line sensor 50 as a detector that detects the light reflected from the documents D, and an image forming lens 54 that causes the light reflected from the documents D to be formed on the line sensor 50 as an image are integrated. Here, the light source 40 is configured to cover the maximum image region of the documents D along the width direction of the documents D (the direction orthogonal to the direction of an arrow SS in the drawing).

The CIS 90 is supported so as to be able to move along the first platen glass 31 and the second platen glass 32 by a moving mechanism that is not illustrated, and thus, in a case where the documents D are moved by the document transportation unit 20A, the CIS 90 reads the document image in a state of being fixed at the portion facing the second platen glass 32, or in a case where the documents D are fixedly set on the first platen glass 31, the CIS 90 reads the document image while moving along the first platen glass 31.

FIG. 6A illustrates an LED module 41 that includes LED elements 42 as light emitting elements configuring a part of the light source 40 in the present embodiment. On the other hand, FIG. 6B illustrates a line sensor 50 that includes light receiving elements 51. In the LED module 41 in the present example, the LED elements of three colors 42B (blue), 42G (green), and 42R (red) are arranged in the transport direction of the document or the progressing direction (the direction SS in the drawing: sub-scanning direction) of the LED module 41, and each of the LED element 42 are arranged along the direction orthogonal to the direction SS, and a length thereof is a length that can cover the maximum image width of the document. In addition, the light receiving elements 51 has one type of spectral sensitivity, and is arranged along the direction orthogonal to the direction SS similar to the LED element 42, the length thereof is a length in which the light from the light source 40 can be reflected at the document and the light reflected from the document can be received and a length having a resolution required for the image. As the line sensor 50 in the present example, a CCD line sensor configured to include diodes or MOS transistors in the receiving portion of the light receiving elements 51.

FIG. 7 is an explanatory diagram schematically illustrating a processing system of a light source 40.

The light source 40 includes LED element 42 of three colors (42B, 42G, and 42R) and a light guide 43 that collects and guides the light reflected from the LED elements 42 to the documents D. In addition, each of the LED elements 42 is electrically controlled by the light control unit 44 which performs the light emission control via each of the drivers 44 (44B, 44G, and 44R), and in the present example, the LED elements 42 are electrically conducted at a preset timing and in a preset pulse width in the order of 42B, 42G, and 42R. Therefore, the light is emitted from the LED elements 42 in the order of blue, green, and red, and the emitted light is radiated to the document D via the light guide 43. Then, as illustrated in FIG. 6, in the line sensor 50, the reflected lights of blue, green, and red are sequentially received in accordance with the order of emission from the LED elements 42.

<Control System>

Figure 8:
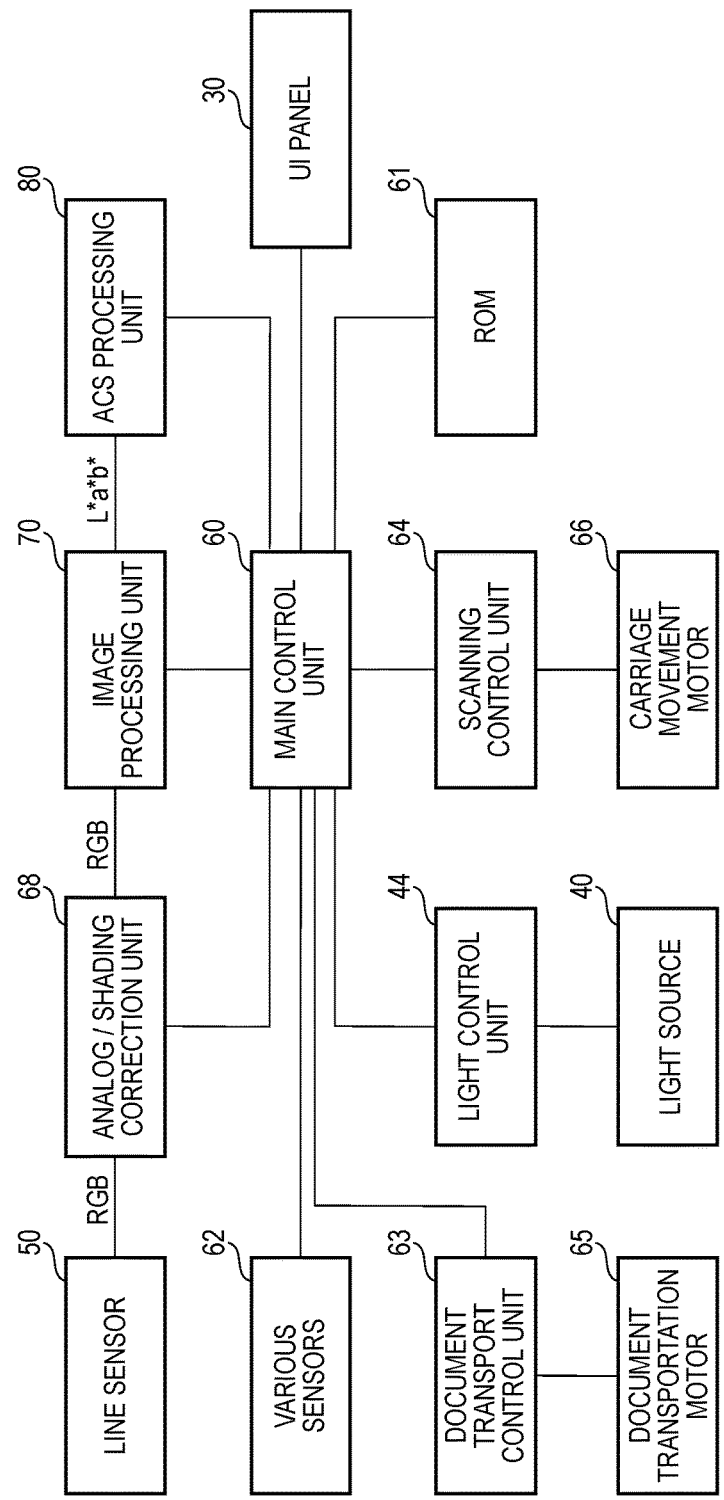
FIG. 8 is a block diagram illustrating a control system of the image reading apparatus.

The signal obtained using the line sensor 50 is processed in a control system. FIG. 8 is a block diagram illustrating a control system of the image reading apparatus 20. A main control unit 60 controls the entire operation of the image reading apparatus 20 and is configured to include a CPU, a RAM, a ROM, and the like, which are not illustrated, and controls various processing operations. In addition, at the outside of the main control unit 60, another ROM 61 is also provided in which information such as a threshold value for various image determination described below is stored in advance. Then, the main control unit 60 performs various controls based on the information from various sensors 62 or the UI panel 30.

As illustrated in FIG. 8, the main control unit 60 controls an analog/shading correction unit 68, an image processing unit 70, an ACS processing unit 80, a document transport control unit 63, a light control unit 44, a scanning control unit 64, a UI panel 30, and the like, and transmits the image information from the image reading apparatus 20 to the image forming unit 11 (refer to FIG. 4).

Here, the document transport control unit 63 controls a document transportation motor 65 in order to control the transportation of the document on the document platen 21 in the document transportation unit 20A. In addition, the light control unit 44 controls the light source 40 described above. Furthermore, as illustrated in FIG. 4 and FIG. 5, for example, in a case where the document is set on the first platen glass 31, the scanning control unit 64 controls a carriage movement motor 66 such that the CIS 90 moves in the direction SS in the drawing.

Then, each of the color components of a pixel signal from the line sensor 50 are sent to the analog/shading correction unit 68 and the shading correction is performed by the analog/shading correction unit 68, and then, the result is sent to the image processing unit 70. At this time, in this example, since the image of the document is read in the line sequential order of B, G, and R, each color component of the pixel signal read in the line sequential order is set to the image processing unit 70 as the color components.

<Image Processing Unit>

Figure 9:
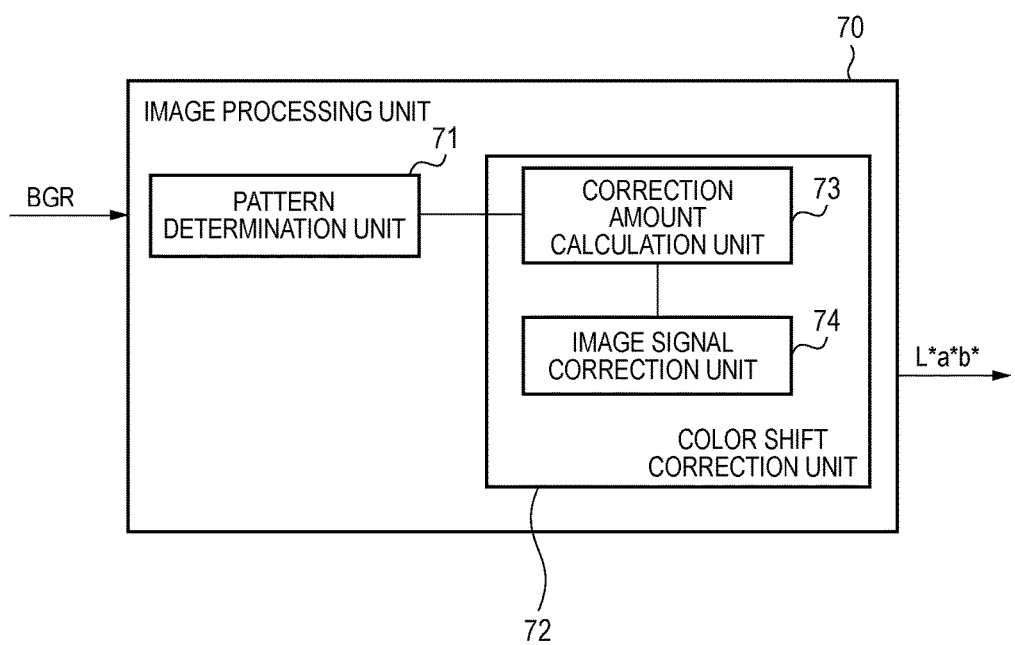
FIG. 9 is a block diagram illustrating an image processing unit.

The image processing unit 70 in the present embodiment is configured as illustrated in FIG. 9. The image processing unit 70 includes a pattern determination unit 71 that determines that, in three continuous pixels in the sub-scanning direction (corresponding to the target pixel and the front and rear pixels), the front and rear pixels along the sub-scanning direction are the white and black pixels (corresponding to the achromatic color pixel) and the target pixel is the color pixel (corresponding to the chromatic color pixel) from the color components of each signal, and determines the degree of matching the conditions for the target pixel to be the color shift pixel between the white and black pixels, and a color shift correction unit 72 that corrects the target pixel to the white and black pixels based on the degree of matching the conditions to be the color shift pixel determined by the pattern determination unit 71.

Here, (1) the front and rear are the white and black pixels, (2) the target pixel is the color pixels, and (3) there is a density change in the front and rear pixels can be examples of the conditions to be the color shift pixel are examples of the conditions to be the color shift pixel.

At this time, for example, in a case where it is assumed that the amount of density change of the front and rear pixels when one of the front and rear pixels is white pixel and the other pixel is the black pixel is 1, for example, the amount of density change of the front and rear pixels when the other pixel is a grey pixel of which the density value is smaller than that of the black pixel is less than 1. Therefore, even when the target pixel is the color pixel between the white and black pixels, since the conditions to be color shift pixel becomes different due to the density change of the front and rear pixels, the pattern determination unit 71 determines the degree of matching the conditions to be the color shift pixel.

Here, the description will be made regarding the color shift.

Figure 10:
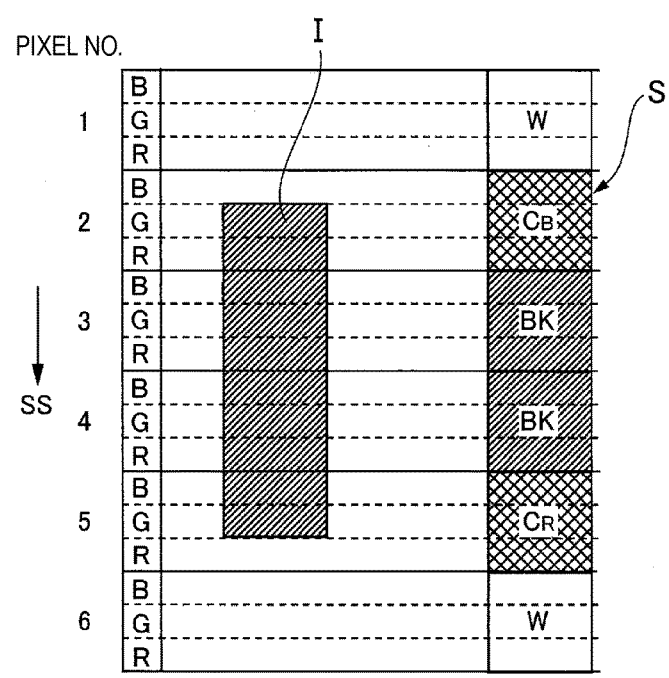
FIG. 10 is an explanatory diagram illustrating an image reading principle of the image reading apparatus in the embodiment 1.

FIG. 10 is an explanatory diagram illustrating a situation in which the color shift pixel is generated.

Now, in a case of the sub-scanning in the direction SS, the light emission order of the LED elements 42 is set to be in the order of B, G, and R and the reading of the color by the line sensor 50 is set to be in the order of B, G, and R. In addition, a sequence of each pixel (constitute one pixel on BGR) at this time is set to be No. 1 to No. 6. Furthermore, an end portion of an image I of the document (corresponding to the reading target) is assumed to be positioned at the position corresponding to the No. 2 and No. 5 in the black pixels extending from the pixel No. 2 to No. 5 as illustrated, the image signal S obtained by the line sensor 50 has colors as follows. The color of pixel No. 2 is blue ($C_B$), pixels No. 3 and 4 are black (BK), pixel No. 5 is red ($C_R$). The colors of pixels No. 1 and No. 6 are white (W).

Generally, in the line-sequential method in which the LED elements 42 of the light source 40 having three colors (in the present example, BGR) are sequentially turned ON and received by one line sensor (corresponding to the line sensor 50), the reading positions in one pixel are different from each of the RGB by ⅓ line, and thus, the position deviation of the reading inevitably occurs. In this state, in a case where the image I (black image) of the document such as that illustrated in FIG. 10, in a boundary region of the end portion of the image I of the document for example, in the pixels No. 2 and No. 5, not all of the three color components BGR is radiated facing the black image, but the light of a part of the color components is radiated on the background region of the document in which the black image is not present. For example, the light of blue color in the pixel No. 2 and the light of red color in the pixel No. 5 are radiated on the background region of each document and are read as the color pixel which is the color shift pixel despite that they were originally white and black pixels, and thus, the color shift eventually occurs in the boundary region of the end portion of the image I (white and black image) of the document. The appearance of the color shift is more remarkable as the resolution becomes lower, and finally a color moiré (coloring phenomenon in the white and black image) occurs on the output image due to periodic interference.

In the present embodiment, even in a case of low resolution (for example, a reading resolution lower than 600 dpi), the processing by the image processing unit 70 is performed in order to suppress the color moiré.

—Determination Processing—

As illustrated in FIG. 9, the pattern determination unit 71 in the present example performs an A/D conversion on each color component signal (B, G, and R) and determines the degree in which the colors of three pixels arrayed in the sub-scanning direction (direction SS) and the density pattern match a particular density pattern based on the density values of the conversion resulted BGR by every unit of pixel.

FIG. 11A illustrates each density value of each color component BGR of each pixel arrayed in the sub-scanning direction (direction SS) as VB, VG, and VR respectively.

In the drawing, numbers "−4" to "0" to "4" are the numbers indicating the positions of each pixel. The pixel at position "0" is assumed to be the target pixel P(0), the pixel at position "−1" is assumed to be $i_{th}$, (i=1 to 4) pixel in front of the target pixel, and the pixel at the position "+j" is assumed to be $j_{th}$, (j=1 to 4) pixel rear to the target pixel. In the drawing, P(−1) and P(+1) indicate the front and rear pixels of the target pixel p(0).

FIG. 11B illustrates an example of a determination algorithm for the pixel determination by the pattern determination unit 71.

In the drawing, Equation (1) indicates an absolute value of the difference in densities between each color component of the pixel P(−1) and P(+1) in front of and to the rear of the target pixel P(0).

Here "deltabb" indicates an absolute value of the difference between the density value VB[−1] of blue and the density value VG[−1] of green in the pixel P(−1), "deltaab" indicates an absolute value of the difference between the density value VB[+1] of blue and the density value VG[+1] of green in the pixel P(+1), "deltabr" indicates an absolute value of the difference between the density value VR[−1] of red and the density value VG[−1] of green in the pixel P(−1), and "deltaar" indicates an absolute value of the difference between the density value VR[+1] of red and the density value VG[+1] of green in the pixel P(+1).

In the drawing, Equation (2) indicates an absolute value of the difference in densities between each color component of the target pixel P(0) and the front and rear pixel P(−1) or P(+1).

Here, "deltag1" indicates an absolute value of the difference between the density values VG[0] and VG[−1] of green between the target pixel P(0) and the pixel P(−1), "deltag2" indicates an absolute value of the difference between the density values VG[0] and VG[+1] of green between the target pixel P(0) and the pixel P(+1), "deltab1" indicates an absolute value of the difference between the density values VB[0] and VB[−1] of blue between the target pixel P(0) and the pixel P(−1), "deltab2" indicates an absolute value of the difference between the density values VB[0] and VB[+1] of blue between the target pixel P(0) and the pixel P(+1), "deltar1" indicates an absolute value of the difference between the density values VR[0] and VR[−1] of red between the target pixel P(0) and the pixel P(−1), and "deltar2" indicates an absolute value of the difference between the density values VR[0] and VR[+1] of red between the target pixel P(0) and the pixel P(+1).

In the drawing, Equation (3) is an equation that expresses the amount of density change of each color component between the target pixel P(0) and the front and rear pixels P(−1) and P(+1) as a density step coefficient (keisu_edge).

Here, in Equation (3), the sum of the differences in the density value of each color component calculated by Equation (2) is divided by a predetermined division coefficient (divK) and multiplied by a predetermined multiplication coefficient (mulK1), and then, the result is weighted by the amount of density change of the front and rear pixels.

The density step coefficient (keisu_edge) is set to be larger as the amount of density change becomes larger, and is treated as the upper limit value α in a case where it exceeds the predetermined threshold value α. In this example, the upper limit value α determines the possible range of the value of the density step coefficient (keisu_edge) (number of bits), and is selected such that the overflow does not occur in the subsequent calculations.

In this example, if the value of (deltag1+deltag2+deltab1+deltab2+deltar1+deltar2) is large, it means that the density step between the target pixel P(0) and the front and rear pixels P(−1) and P(+1) is large.

Furthermore, in the drawing, regarding the difference in densities between each color component of the pixel P(−1) and P(+1) in front of and to the rear of the target pixel P(0) calculated by Equation (1), Equation (4) indicates that the front and rear pixels P(−1) and P(+1) are the white and black pixels as a coefficient (keisu) as the difference in densities becomes smaller.

Here, in Equation (4), when the value of (deltabb+deltaab+deltabr+deltaar) becomes small, the variations of the of each density value of BGR of the front and rear pixels P(−1) and P(+1) becomes small, and thus, the front and rear pixels P(−1) and P(+1) have a high probability of being the white and black pixels.

At this time, in Equation (4), when the added value of (deltabb+deltaab+deltabr+deltaar) is small, in order to make the coefficient (keisu) be large, the above-described added value is subtracted from a predetermined fixed coefficient subK.

In addition, in the present example, in a case where the keisu is less than zero, the keisu is set to zero. Furthermore, in setting the keisu, the keisu is multiplied by a predetermined multiplication coefficient mulK2 such that the keisu becomes a value sufficient with respect to the predetermined lower limit value shiftK, and then, is weighted by an optimal weight. The lower limit value shiftK is set so as to increase the calculation accuracy below the decimal point by combining with the multiplication coefficient mulK2.

In addition, in FIG. 11B, Equation (5) indicates that the density step coefficient (keisu_edge) calculated by Equation (3) is multiplied by the coefficient (keisu) calculated by Equation (4) in order to make the two coefficients be one correction coefficient (keisu).

Here, in a case where the correction coefficient (keisu) exceeds a predetermined upper limit value $\beta$, the correction coefficient (keisu) is treated as the upper limit value $\beta$. In the present example, the upper limit value $\beta$ determines the possible range of the value of the correction coefficient (keisu) (number of bits), and is selected such that the overflow does not occur in the subsequent calculations.

Figure 12:
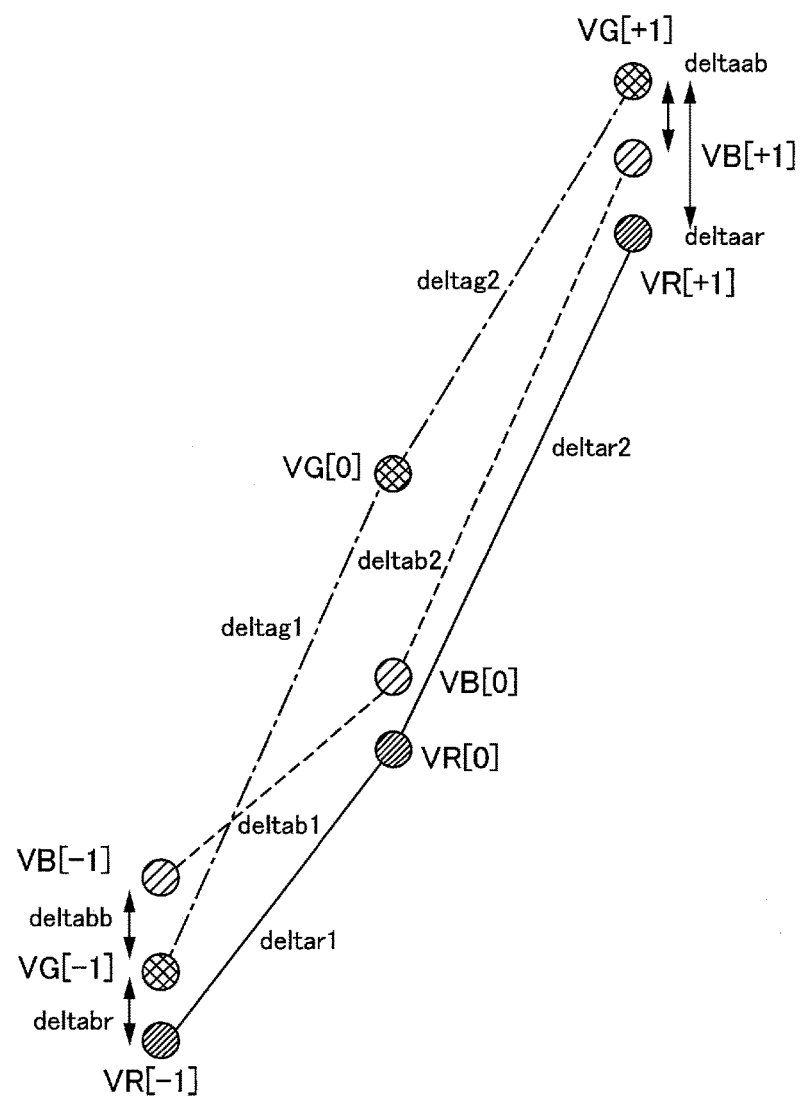
FIG. 12 is an explanatory diagram schematically illustrating an example of determination processing of an image pattern using the determination algorithm illustrated in FIG. 11B.

In addition, in FIG. 12, the determination algorithm in FIG. 11B is schematically illustrated. In this determination algorithm, the degree of matching the conditions for the target pixel P(0) to be the color shift pixel between the front and rear white and black pixels is determined as the correction coefficient (keisu).

As the value of this correction coefficient (keisu) becomes larger, the algorithm indicates that the above-described degree of matching the conditions to be the color shift pixel becomes higher, and the correction coefficient (keisu) is used in correction processing described below.

—Correction Processing—

Next, when the degree of matching the conditions for the target pixel P(0) to be the color shift pixel between the white and black pixels is determined by the pattern determination unit 71, as illustrated in FIG. 13, a correction amount calculation unit 73 (refer to FIG. 9) in the color shift correction unit 72 calculates the color shift correction amount $\delta$ using the correction coefficient (keisu) calculated by Equation (5) in FIG. 11. In the present example, the density values of the color components B and R approach the density value of the color component G with the density value of the color component G as the center component among the three color components of BGR of the target pixel P(0). In this correction, the differences between the density values of the color components B and R and the density value of the color component G are multiplied by the correction coefficient (keisu) and the results are added or subtracted, and then, the density values of the color components B and R approach the density value of the color component G.

More detailed description using FIG. 13 is as follows.

Now, when VG[0]>VB[0], tmpint_2 is calculated as illustrated in Equation (6).

Here, $\gamma$ indicates a predetermined division coefficient and performs the weighting in calculating the tmpint_2. The division coefficient $\gamma$ is selected for determining a position of the decimal point with respect to the calculated correction coefficient (keisu). For example, in a case where a bit of 0×80 (128) is assumed to be 1, then, $\gamma$ is 0×80.

In this case, B after correction=tmpint_2. However, if tmpint_2>$\eta$, tmpint_2=$\eta$, and if tmpint_2<0, tmpint_2=0. $\eta$ is a predetermined upper limit value.

In addition, when VG[0]≤VB[0], tmpint_2 is calculated as illustrated in Equation (7).

Here, $\gamma$ indicates a predetermined division coefficient and performs the weighting in calculating the tmpint_2.

In this case, B after correction=tmpint_2.

However, if tmpint_2>$\eta$, tmpint_2=$\eta$, and if tmpint_2<0, tmpint_2=0.

In addition, regarding the density value of the color component G is not the target of correction but is reference density value as illustrated in FIG. 8). Therefore, G after correction=VG[0].

In addition, when VG[0]>VB[0], tmpint_2 is calculated as illustrated in Equation (9).

Here, $\gamma$ indicates a predetermined division coefficient and performs the weighting in calculating the tmpint_2.

In this case, R after correction=tmpint_2. However, if tmpint_2>$\eta$, tmpint_2=$\eta$, and if tmpint_2<0, tmpint_2=0.

In addition, when VG[0]≤VB[0], tmpint_2 is calculated as illustrated in Equation (10). Here, $\gamma$ indicates a predetermined division coefficient and performs the weighting in calculating the tmpint_2. In this case, R after correction=tmpint_2.

However, if tmpint_2>$\eta$, tmpint_2=$\eta$, and if tmpint_2<0, tmpint_2=0.

Figure 14:
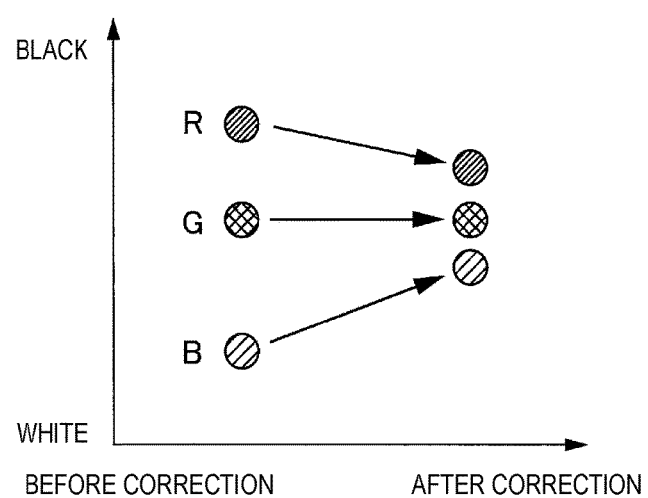
FIG. 14 is an explanatory diagram illustrating an example of correction processing using the correction algorithm illustrated in FIG. 13.

FIG. 14 is an explanatory diagram schematically illustrating the correction processing by the correction algorithm illustrated in FIG. 13.

In the drawing, regarding the color component B, "VB[0]+(VG[0]−VB[0])×keisu/$\gamma$" is the density value of the color component B after the correction as illustrated in Equation (6) in FIG. 13, and on the other hand, regarding the color component R, "VR[0]−((VR[0])−VG[0])×keisu/$\gamma$" may be the density value of the color component R after the correction as illustrated in Equation (10) in FIG. 13.

In FIG. 14, regarding the color component B, since VG[0]>VB[0], the density value of the color component B after the correction increases based on the correction coefficient keisu and approaches VG[0]. At this time, if the correction coefficient keisu approaches 1, the density value substantially coincides with VG[0].

In addition, regarding the color component R, since VG[0]>VR[0], the density value of the color component R after the correction decreases based on the correction coefficient keisu and approaches VG[0]. At this time, if the correction coefficient keisu approaches 1, the density value substantially coincides with VG[0].

As described above, the fact that the density values of the color components R and B approach the color component G with the density value of the color component G as the center is because of the fact that the color shift can become the white and black image by making the difference in densities between the colors be small since the color swift becomes color pixel by making the difference in densities between the BGR be large. Here, in this correction method, the correction target is the color components B and R. However, for example, it is needless to say that the density value of the color component R or another color component may approach the color component G with the color component R as the center.

Then, as illustrated in FIG. 9, in the color shift correction unit 72, the image signal of the corrected document image is generated by the image signal correction unit 74 based on the color shift correction amount $\delta$ calculated by the correction amount calculation unit 73, and the image signal of the L*a*b color system is sent to the ACS processing unit 80 (refer to FIG. 8).

Next, an example of correcting the color shift adopted in the image reading apparatus in the present embodiment.

Figure 15:
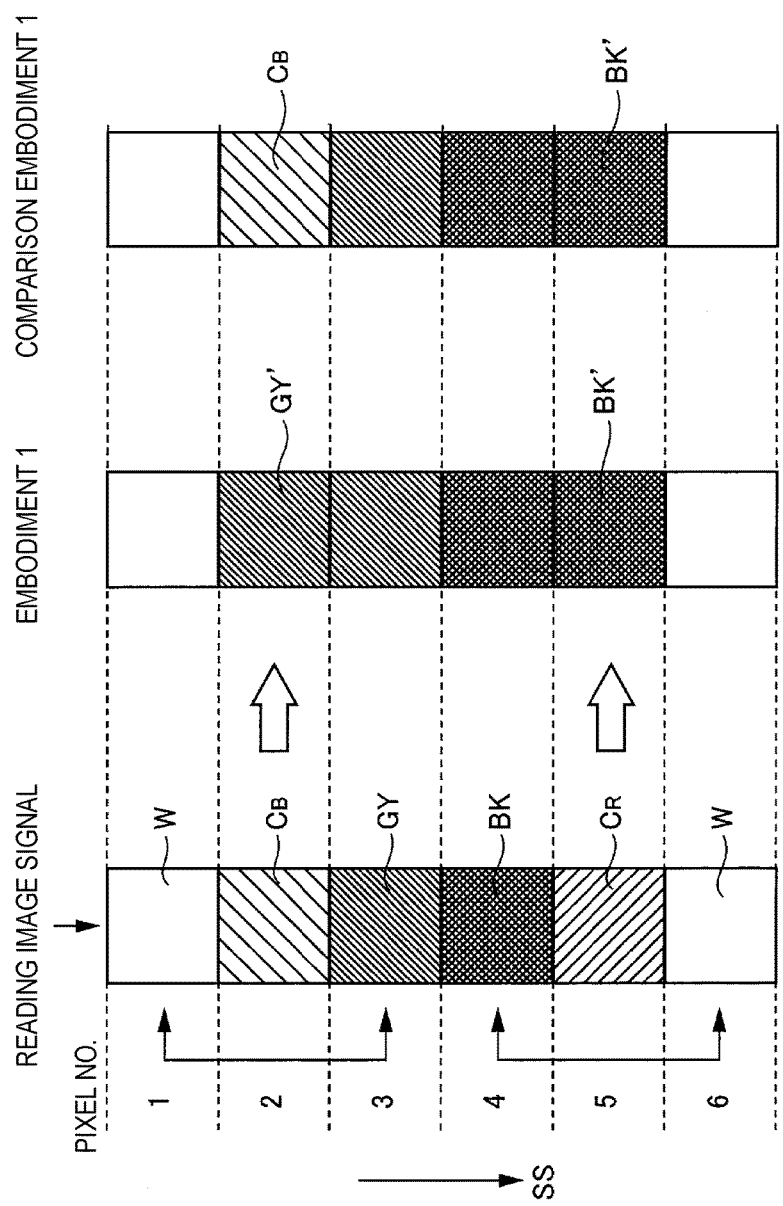
FIG. 15 is an explanatory diagram schematically illustrating a change after the correction of the color shift pixel between the achromatic color pixels using the image reading apparatus in the embodiment 1 and a change after the correction of the color shift pixel between the achromatic color pixels using the image reading apparatus in a comparison embodiment 1.

Now, as illustrated in FIG. 15, as six reading image signals of the six pixels (pixels No. 1 to No. 6) arrayed in the sub-scanning direction (the direction SS) before the correction, for example, in a case of assuming that the pixels No. 1 and No. 6 are white pixels, the pixel No. 2 is the color pixel $C_B$ (blue), the pixel No. 5 is the color pixel $C_R$ (red), the pixel No. 3 is the grey pixel $G_Y$ (corresponding to the white and black pixel having lower density that that of black), and the pixel No. 4 is the black pixel BK, in the present embodiment, regarding the three pixels of the pixel No. 1 to No. 3, from the fact that the target pixel No. 2 is the color pixel $C_B$, one of the front and rear pixel is the white pixel W and the other is the grey pixel GY, it can be understood that the target pixel No. 2 satisfies the conditions to be the color shift pixel between the white and black pixels. However, in a case of the target pixel No. 2, since the amount of density change (density step) of the front and rear pixels is not so large, the correction coefficient keisu that indicates the degree of matching the conditions to be the color shift pixel is not so high.

Accordingly, color shift correction amount for the target pixel No. 2 is set based on the correction coefficient keisu, and the target pixel No. 2 is decolorized from the color pixel $C_B$ according to the color shift correction amount, and then, is corrected to the white and black pixel (grey pixel) GY having a predetermined density value.

On the other hand, regarding the three pixels of the pixel No. 4 to No. 6, from the fact that the target pixel No. 5 is the color pixel $C_R$, one of the front and rear pixel is the white pixel W and the other is the black pixel BK, it can be understood that the target pixel No. 5 satisfies the conditions to be the color shift pixel between the white and black pixels. Here, in a case of the target pixel No. 5, since the amount of density change (density step) of the front and rear pixels is large, the correction coefficient keisu that indicates the degree of matching the conditions to be the color shift pixel is high.

Accordingly, color shift correction amount for the target pixel No. 5 is set based on the correction coefficient keisu, and the target pixel No. 5 is decolorized from the color pixel $C_R$ according to the color shift correction amount, and then, is corrected to the white and black pixel (black pixel) BK having a high density value.

Comparison Embodiment 1

In addition, as an image reading apparatus in a comparison embodiment 1, for example, when it is determined that the pixels in front of and to the rear of the target pixel are monochrome pixels, assuming that a method in which the target pixel is determined to be the abnormal monochrome pixel is exemplified in a case where the difference between the maximum value and the minimum value of each pixel value of each component of the target pixel is greater than a predetermined threshold value, from the fact that a two step method in which it is determined whether or not the target pixel is the abnormal monochrome pixel is adopted, for example, regarding the three pixels of pixel No. 4 to No. 6 in FIG. 15, one of the pixels in front of and to the rear of the target pixel is white pixel W and the other is a black pixel BK. Therefore, the front and rear pixels may be determined to be monochrome pixels. As a result, the pixel No. 5 may be determined to be an abnormal monochrome pixel, and thus, may be corrected to the monochrome pixel.

However, for example, regarding three pixels of No. 1 to No. 3 in FIG. 15, one of the pixels in front of and to the rear of the target pixel is white pixel W and the other is a grey pixel GY. Therefore, for example, in a case where density value of the grey pixel GY is low, there is a concern that the front and rear pixels may not be determined to be the monochrome pixels. Therefore, in this case, the determination processing that determines whether or not the target pixel No. 2 is the abnormal monochrome pixel is not performed, and the target pixel No. 2 is not corrected to the monochrome pixel, and thus, there is concern that the abnormal monochrome pixel (color pixel $C_B$) remains as it is.

Modification Embodiment 1

As described above, in the present embodiment, as illustrated in FIG. 11 to FIG. 14, from the color and the density of the pixels in front of and to the rear of the target pixel, the degree of matching the conditions for the target pixel to be the color shift pixel between the white and black pixels is determined, the degree of matching is calculated as the correction coefficient, and then, the color shift correction amount with respect to the color shift pixel is variably set. However, it is not limited to the above method, and a following method can be adopted.

(1) Determination Algorithm

By detecting that the target pixel is the color pixel and the pixels adjacent to front and rear of the target pixel are the white and black pixels, the pattern determination unit 71 treats the target pixel as matching the condition to be the color shift pixel between the white and black pixels. However, when calculating the degree of matching the condition to be the color shift pixel, the degree of matching the condition to be the color shift pixel may be calculated mainly using the information about the difference in densities between each color component of the pixels in front of and to the rear of the target pixel without using the information about the difference in densities between each color component of front and rear pixels among the information considered in the embodiment 1.

(2) Correction Algorithm

In the present embodiment, any of the color components among the three color components BGR of the target pixel P(0), for example, the density value G as the center, the method is adopted, in which a correction is performed such that the density values of the color components B and R approach the density value of the color component G. However, a method may be adopted, in which the difference in densities between the maximum value and the minimum value among the densities of each color component of the target pixel P(0) is calculated, the color shift correction amount is set by adding the degree of matching calculated by the pattern determination unit 71 to the difference in densities, and then, the correction is performed such that the above-described difference in densities becomes small.

<ACS Processing Unit>

Next, the ACS processing unit 80 will be described.

Figure 16:
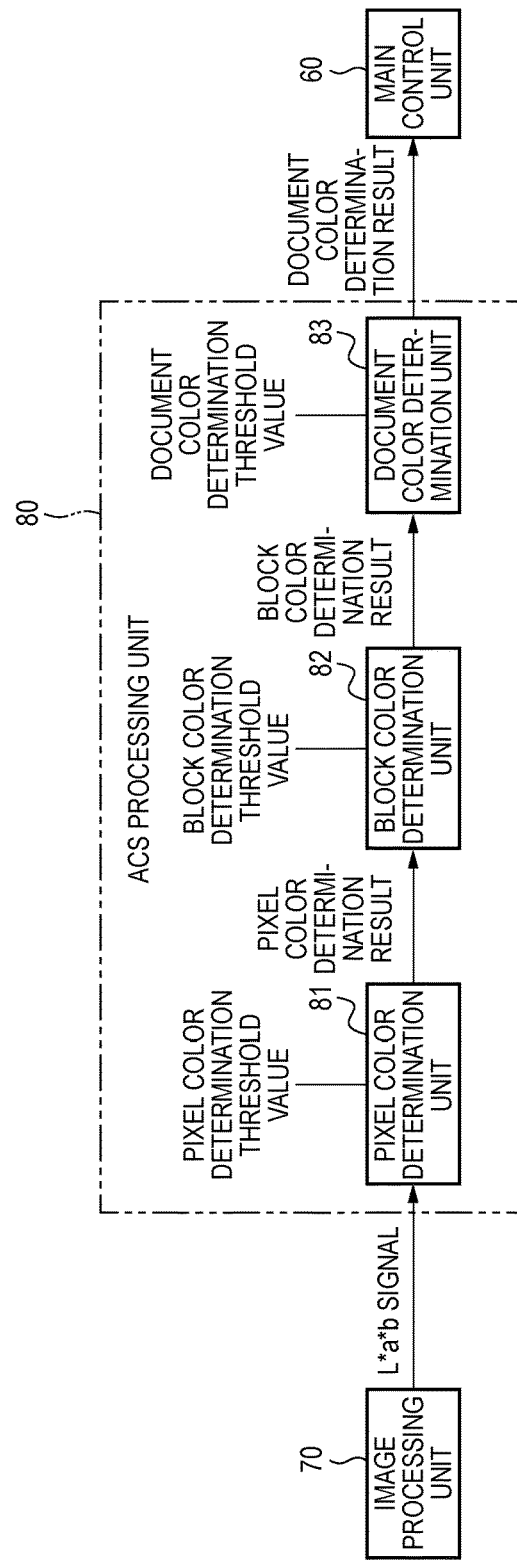
FIG. 16 is a block diagram illustrating details of an ACS processing unit used in the embodiment 1.

FIG. 16 is block diagram for illustrating the ACS processing unit 80. As illustrated in FIG. 16, the ACS processing unit 80 is configured to include a pixel color determination unit 81, a block color determination unit 82, and a document color determination unit 83. The pixel color determination unit 81 determines whether the pixel that configures the document image read by the line sensor 50 is a white and black pixel or a color pixel.

The determination of the pixel color (a color pixel or a white and black pixel) by the pixel color determination unit 81 is performed for each pixel (unit of pixel) of the image signal from the document. Specifically, among the L*, a*, and b*, based on a* and b* which is saturation information, the actual a* and b* and a maximum value and a minimum value of pixel color determination threshold values set in advance are compared with each other. Then, based on the comparison result, it is determined whether the determination target pixel is a pixel color determination threshold value or a color pixel. The result of the pixel color determination determined by the pixel color determination unit 81 is sent to the next block color determination unit 82.

The block color determination unit 82 divides the reading region of the image according to the document size into a predetermined N pixels×M lines unit of blocks, and determines whether the block is a white and black block or a color block for each of the blocks. In the block color (white and black/color) determination processing by the block color determination unit 82, the result of pixel color determination sent from the pixel color determination unit 81 is used. That is, in the block color determination unit 82, the number of color pixels included in the divided block as described above is counted and the counted number and the maximum value and the minimum value of the predetermined block color threshold values are compared with each other, and then, it is determined whether the determination target block is a white and black block or a color block based on the comparison result. The result of block color determination by the block color determination unit 82 is sent the next document color determination unit 83.

The document color determination unit 83 determines whether the document is a white and black document or a color document. In the document color (white and black/color) determination by the document color determination unit 83, the result of block color determination sent from the block color determination unit 82 is used. That is, in the document color determination unit 83, the number of blocks determined to be the color block by the block color determination unit 82 is counted among the divided block in the reading region of the image corresponding to the document size as described above, and the counted number and the maximum value and the minimum value of the predetermined document color determination threshold values are compared with each other, and then, it is determined whether the document is a white and black document or a color document, based on the comparison result. The result of the document color determination by the document color determination unit 83 is sent to the main control unit 60 and is used in image forming performed in the image forming unit 11 (refer to FIG. 4).

Here, as described above, the ACS processing is performed by the ACS processing unit 80 based on the a* and b* which is saturation information among the L*, a*, and b*. However, if the reading target document is a white and black document, since the document does not have saturation, the a* and b* take values are approximately zero. In addition, if the reading target document is the color document, since the document has the saturation, a* and b* are values that deviate from zero. Accordingly, if the above-described maximum value and the minimum value are set in the range same from the a* and b*, usually from zero as a center, the determination of whether the read document is the white and black document or the color document can be performed. However, in actuality, due to the variations for each of the image reading apparatuses 20 or a change in temporal reading characteristics, even in a case of the white and black image, there is a case where the average of the a* and b* is a value deviated from zero.

As described above, according to the present embodiment, even in a case where the target pixel is the color shift pixel (color pixel) between the white and black pixels, by performing the correction processing described above, the target pixel is corrected to the white and black pixels in which the color shift is suppressed. Therefore, for example, in the document image having a white and black image pattern such as a white and black ladder or a white and black halftone, an image signal that matches the document image which does not have the color shift in the boundary region of the white and black pixels can be obtained.

Then, even when the ACS processing is performed, since the processing is based on the image signal on which the color shift correction is performed, an appropriate color selection processing can be performed.

Modification Embodiment 2

Figure 17:
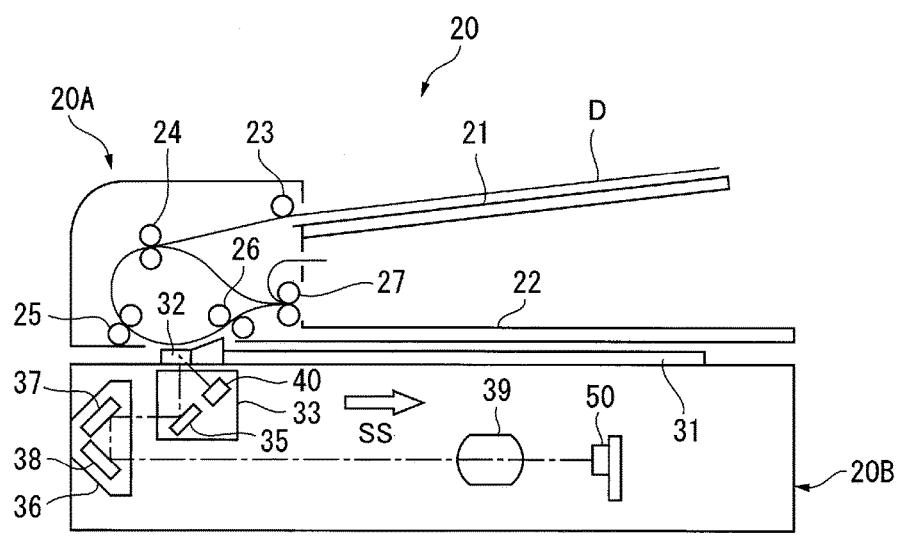
FIG. 17 is an explanatory diagram illustrating a configuration of a light source and a line sensor in a modification embodiment 2.

In the embodiment, the CIS 90 in which the light source 40 and the line sensor 50 are integrated is used. However, not being limited to that, as illustrated in FIG. 17, the configuration can be an aspect in which the light source 40 and the line sensor 50 are configured as separate bodies.

In the present example, a movable light source unit 33 is provided in the document reading unit 20B along the first platen glass 31 and the second platen glass 32, or the line sensor 50 is fixedly installed at a predetermined position.

Here, the light source unit 33 is a unit that radiates the light toward the surface of the document D and induces the light reflected from the document D, and includes the light source 40 configured so as to be along the width direction (a direction orthogonal to the direction SS in the drawing) of the document D and so as to cover the maximum image region of the document D, and a reflection mirror 35 that reflects the light from the document D to the substantially right angle.

Furthermore, in the document reading unit 20B, two sheets of reflection mirrors 37 and 38 symmetrically disposed in order to reflect the light reflected by the reflection mirror 35 from the document D toward the line sensor 50 are fixed in the housing of the document reading unit 20B in a state of being held by the holding frame 36. Then, as illustrated by the dashed line in the drawing, the light reflected by the reflection mirror 38 forms an image on the line sensor 50 through a lens 39. Therefore, in the present example, in the document D fed via the document transportation unit 20A, the light reflected from the document D forms an image on the line sensor 50 via the second platen glass 32 in the state in which the light source unit 33 is disposed at a fixed position. On the other hand, in the document D set on the first platen glass 31, the light reflected from the document D sequentially forms an image on the line sensor 50 by moving the light source unit 33 in the direction SS in the drawing (corresponding to the sub-scanning direction).

EXAMPLES

Figure 18A:
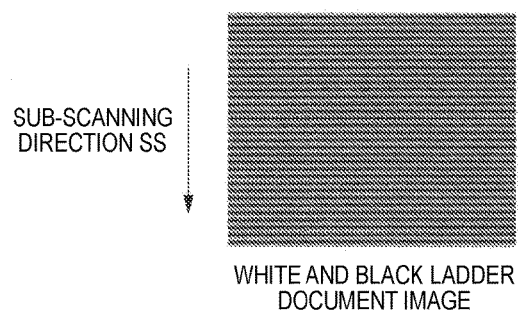
FIG. 18A is a diagram illustrating an example of a document image used in the execution example.

In the present execution example, FIG. 18A illustrates a result of measuring the reading densities of BGR when a white and black ladder in which the straight line image extending in the scanning direction is configured to be white and black stripes in a ladder shape in the sub-scanning direction SS, is read in the sub-scanning direction.

Figure 18B:
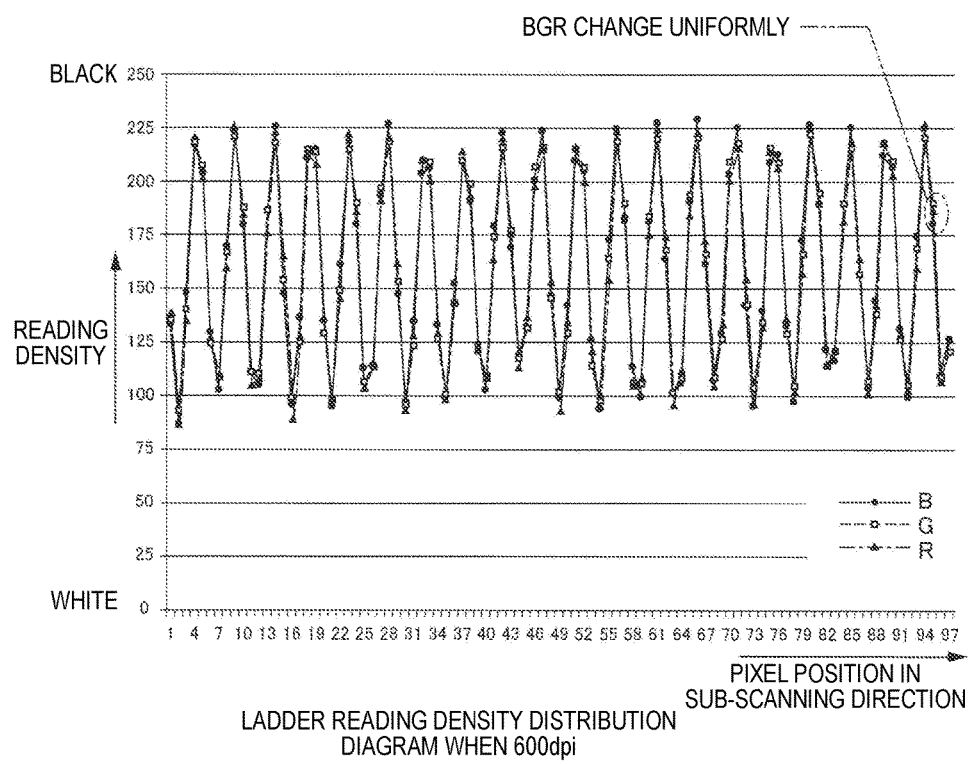
FIG. 18B is a graph illustrating an example of reading densities when a reading resolution is 600 dpi.

First, the reading densities of each color BGR when the reading resolution is 600 dpi is illustrated in FIG. 18B. As illustrated, since the resolution is high in 600 dpi, it can be seen that the deviation of the reading position of the BGR is small and the reading densities of the BGR is uniformly changed. That is, it can be understood that the white and black ladder is read as the white and black image.

On the other hand, FIG. 19 illustrates the reading density of each color BGR when reading the white and black ladder document image in FIG. 18A with the resolution of 400 dpi. In this case, the reading densities of BGR are not uniform and the deviation thereof periodically changes. Therefore, the deviation becomes a color moié that periodically occurs. That is, it can be understood that the color moié occurs when the resolution is low (in the present execution example, 400 dpi), and there is no problem in a case of high resolution (in the present execution example, 600 dpi).

In addition, in FIG. 19, when focusing on the pixel positioning the sub-scanning direction, for example, around the pixel positions 41 and 42, the density values of the front and rear pixels largely change, it can be understood that the color moié periodically occurs at the position corresponding to that position.

Generally, when the reading resolution is high, not only do the costs of the line sensor 50 become higher, but also the processing speed is reduced. Therefore, in a case of attempting the decrease of the price and increase of the processing speed of the line sensor 50, the reading resolution needs to high, and thus, it is necessary to solve the technical problems described above.

For this reason, in the present execution example, by correcting the reading densities of the BGR read in a low resolution, the color moiré can be suppressed from occurring.

FIG. 20 is a graph illustrating an example of the reading densities after performing the correction processing using the image reading apparatus in the embodiment 1 with respect to the reading densities in FIG. 19. As it is made clear by comparison with FIG. 19, even when focusing on around the pixel positions 41 and 42 in the sub-scanning direction, it can be understood that the reading densities of the BGR are uniform. For this reason, an image in which the color moié is prevented from occurring can be obtained using the pixel signal after the correction processing.

For example, even the correction processing is performed on the reading densities of the BGR in FIG. 19 using the image reading apparatus in the comparison embodiment (the apparatus that adopts the correction method in which the density value of the color shift pixel between the achromatic color pixels is replaced with the density value of the front and rear pixels), since in the pixel positions for example, around the pixel positions 41 and 42 in the sub-scanning direction, the density values of the front and rear pixels largely change, even if the density value of the color shift pixel is merely replaced with the density values of the front and rear pixels, there is concern that the correction is not correctly performed instead of corrected to the original density.

Figure 21A:
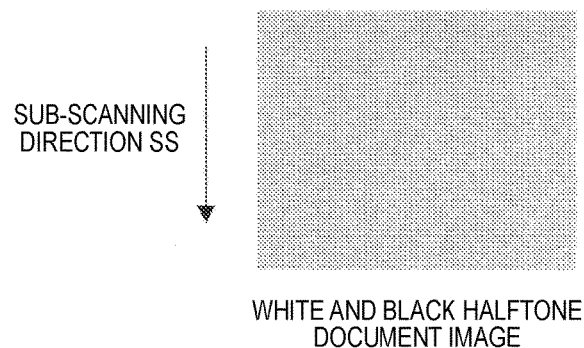
FIG. 21A is a diagram illustrating another example of a document image (an example of a halftone image pattern) used in the execution example.
Figure 21B:
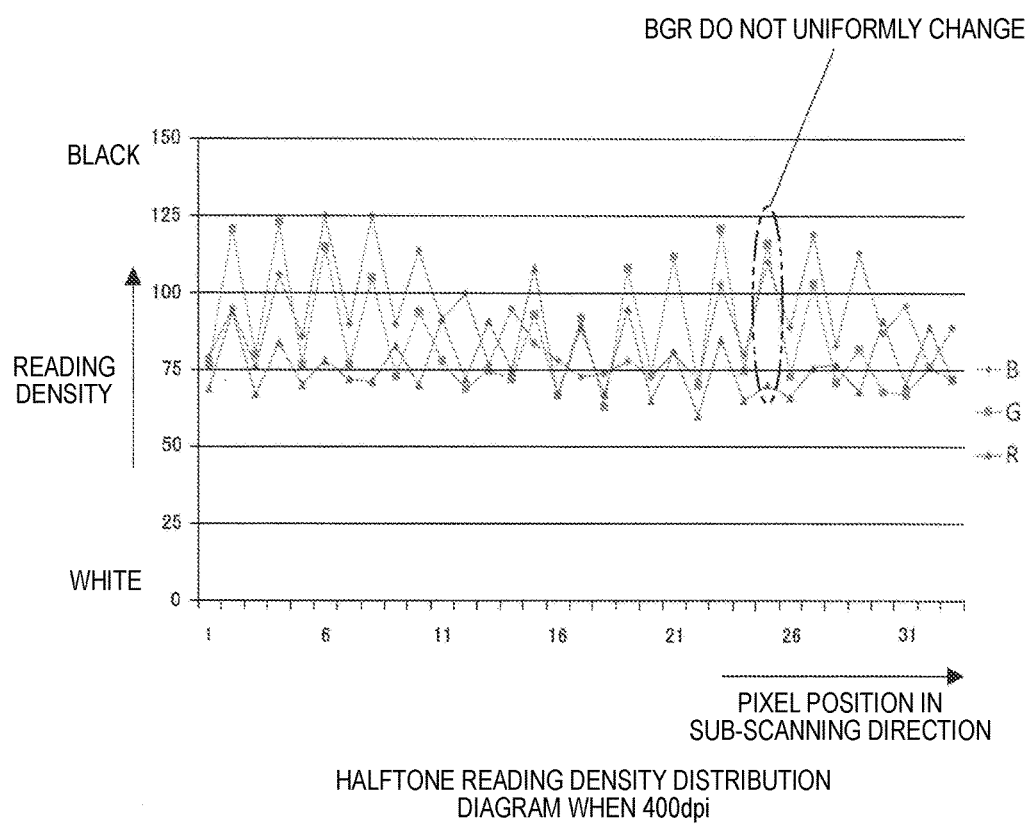
FIG. 21B is a graph illustrating an example of reading densities when the reading resolution is 400 dpi in the document image illustrated in FIG. 21A.

In addition, instead of the white and black ladder document image in FIG. 18A, as illustrated in FIG. 21A, in a case where a white and black halftone document image in which a black image portion (dot) is present in one pixel region and the black image portion is not present at the position in front of and to the rear of the target pixel in the sub-scanning direction and in a case of being read at the reading resolution, for example, as low as 400 dpi, since the colors of reading the dots of the halftone reading image are not entire three colors of BGR, the reading portion itself for reading the dots is colored. At this time, for example, as illustrated in FIG. 21B, it is understood that the reading densities of each color component BGR do not uniformly change, and in addition, the change in a periodical way at a period of dots.

Therefore, the color moié periodically occurs. However, when measuring the reading densities of BGR after performing the correction processing on the image pattern of BGR as described above using the image reading apparatus in the embodiment 1, as illustrated in FIG. 22, it can be found that the reading densities uniformly change and the image in which the color moié is suppressed is obtained.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
   a light source that sequentially radiates lights having color components different from each other onto a reading target;
   a detector that sequentially detects lights having each color component reflected from the reading target among the lights radiated from the light source, the detector detecting the lights as image signals; and
   at least one processor that:
   processes an image of the reading target so as to determine a color and density of each pixel of the image of the reading target based on the image signals having each color component detected by the detector;
   compares a target pixel in the image of the reading target and adjacent front and rear pixels of the target pixel along a detecting direction by the detector and that
   determines a degree of matching of the target pixel to a condition for the target pixel to be a color shift pixel between the adjacent front and rear pixels which are achromatic color pixels based on a pattern of the color and density;
   calculates the degree of matching the condition for the target pixel to be the color shift pixel between the adjacent front and rear pixels which are achromatic color pixels as a correction coefficient;
   variably sets a color shift correction amount of the target pixel based on the degree of matching determined and using the correction coefficient; and
   corrects the image signal of the target pixel by the color shift correction amount such that the target pixel which is the color shift pixel becomes an achromatic color pixel,
   wherein the at least one processor determines the degree of matching the condition for the target pixel to be the color shift pixel between the adjacent front and rear pixels which are achromatic color pixels as a correction coefficient by detecting that the adjacent front and rear pixels of the target pixel are the achromatic color pixels, by detecting a density change in the adjacent front and rear pixels of the target pixel, and by detecting that the target pixel is a chromatic color pixel,
   wherein an amount of density change between the achromatic color pixels is calculated by dividing the amount of density change between first and second achromatic color pixels into a first density change and a second density change, and then, adding the first density change and the second density change, the first density change being the amount of density change between the first achromatic color pixel and the target pixel and the second density change being the density change between the second achromatic color pixel and the target pixel.

2. The image reading apparatus according to claim 1, wherein the at least one processor determines whether the adjacent front and rear pixels have a pixel pattern in which one pixel of the adjacent front and rear pixels is a white pixel and other pixel of the adjacent front and rear pixels is the achromatic color pixel based on the fact that the adjacent front and rear pixels of the target pixel are the achromatic color pixels and the density change of the adjacent front and rear pixels of the target pixel, and calculates the degree of matching the condition for the target pixel to be the color shift pixel.

3. The image reading apparatus according to claim 1, wherein the at least one processor determines that the target pixel satisfies the condition for the target pixel to be the color shift pixel between the adjacent front and rear pixels which are achromatic color pixels by detecting that the target pixel is the chromatic color pixel and that the adjacent front and rear pixels are the achromatic color pixels, and calculates the degree of matching the condition for the target pixel to be the color shift pixel from a density change between the adjacent front and rear pixels.

4. The image reading apparatus according to claim 1, wherein at least one processor calculates a density difference between a predetermined color component and other color component among densities of each color component of the target pixel, and determines the color shift correction amount based on the density difference as well as the degree of matching determined.

5. The image reading apparatus according to claim 1, wherein the at least one processor calculates a density difference between a maximum value and a minimum value among densities of each color component of the target pixel, and determines the color shift correction amount based on the density difference as well as the degree of matching determined.

6. The image reading apparatus according to claim 1, wherein the detector detects the image signals of the reading target by a resolution of lower than 600 dpi.

7. The image reading apparatus according to claim 1, wherein the at least one processor automatically determines whether the image of the reading target is a color image or a monochrome image on the image signals corrected.

8. An image forming apparatus comprising:
an image reading apparatus according to claim 1, wherein the at least one processor executes image forming processing using the image signal detected by the image reading apparatus.

9. An image reading apparatus comprising:
a light source that sequentially radiates lights having color components different from each other onto a reading target;
a detector that sequentially detects lights having each color component reflected from the reading target among the lights radiated from the light source, the detector detecting the lights as image signals; and
at least one processor that:
processes an image of the reading target so as to determine a color and density of each pixel of the image of the reading target based on the image signals of each color component detected by the detector,
calculates a degree of matching a condition for a target pixel to be a color shift pixel between adjacent front and rear pixels which are achromatic color pixels as a correction coefficient by detecting that the adjacent front and rear pixels of the target pixel are the achromatic color pixels, by detecting a density change in the adjacent front and rear pixels of the target pixel, and by detecting that the target pixel is a chromatic color pixel,
variably sets a color shift correction amount using the correction coefficient, and
in a condition that the target pixel of the image of the reading target is a chromatic color pixel and one of adjacent front and rear pixels of the target pixel along a detecting direction by the detector is a white pixel and other of the adjacent front and rear pixels is an achromatic color pixel, the at least one processor variably sets a density correction value based on a density change amount between the adjacent front and rear pixels of the target pixel, and correcting the target pixel to the achromatic color pixel from the chromatic color pixel using the color shift correction amount,
wherein an amount of density change between the achromatic color pixels is calculated by dividing the amount of density change between first and second achromatic color pixels into a first density change and a second density change, and then, adding the first density change and the second density change, the first density change being the amount of density change between the first achromatic color pixel and the target pixel and the second density change being the density change between the second achromatic color pixel and the target pixel.

10. An image reading apparatus comprising:
a light source that sequentially radiates lights having color components different from each other onto a reading target;
a detector that sequentially detects lights having each color component reflected from the reading target among the lights radiated from the light source, the detector detecting the lights as image signals; and
at least one processor that:
processes an image of the reading target so as to determine a color and density of each pixel of the image of the reading target based on the image signals of each color component detected by the detector,
calculates a degree of matching a condition for a target pixel to be a color shift pixel between adjacent front and rear pixels which are achromatic color pixels as a correction coefficient,
variably sets a color shift correction amount using the correction coefficient, and
in a condition that the target pixel of the image of the reading target is a chromatic color pixel and one of adjacent front and rear pixels of the target pixel along a detecting direction by the detector is a white pixel and other of the adjacent front and rear pixels is an achromatic color pixel, the at least one processor variably sets a density correction value based on a density change amount between the adjacent front and rear pixels of the target pixel, and correcting the target pixel to the achromatic color pixel from the chromatic color pixel using the color shift correction amount,
wherein an amount of density change between the achromatic color pixels is calculated by dividing the amount of density change between first and second achromatic color pixels into a first density change and a second density change, and then, adding the first density change and the second density change, the first density change being the amount of density change between the first achromatic color pixel and the target pixel and the second density change being the density change between the second achromatic color pixel and the target pixel, and then, adding the first density change and the second density change.

* * * * *